(12) United States Patent
Liu et al.

(10) Patent No.: US 10,832,678 B2
(45) Date of Patent: Nov. 10, 2020

(54) FILTERING AUDIO-BASED INTERFERENCE FROM VOICE COMMANDS USING INTERFERENCE INFORMATION

(71) Applicant: International Business Machines Corporation, Armonk, NY (US)

(72) Inventors: Su Liu, Austin, TX (US); Eric J. Rozner, Austin, TX (US); Inseok Hwang, Austin, TX (US); Chungkuk Yoo, Yuseong-gu (KR)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/004,234

(22) Filed: Jun. 8, 2018

(65) Prior Publication Data
US 2019/0378512 A1    Dec. 12, 2019

(51) Int. Cl.
*G10L 15/00* (2013.01)
*G10L 15/26* (2006.01)
*G10L 15/22* (2006.01)
*G06F 16/903* (2019.01)

(52) U.S. Cl.
CPC ........ *G10L 15/26* (2013.01); *G06F 16/90335* (2019.01); *G10L 15/22* (2013.01); *G10L 2015/223* (2013.01)

(58) Field of Classification Search
CPC .................................................... G10L 15/00
USPC ........ 704/235, 4, 251, 246, 250, 233; 701/2; 381/58; 707/769, 797
See application file for complete search history.

(56) References Cited

U.S. PATENT DOCUMENTS

| 6,505,155 B1 * | 1/2003 | Vanbuskirk | G10L 15/22 704/246 |
| 6,950,796 B2 | 9/2005 | Ma et al. | |
| 8,849,670 B2 | 9/2014 | Di Cristo et al. | |
| 9,439,078 B2 | 9/2016 | Menon et al. | |
| 9,727,226 B2 | 8/2017 | Leskela et al. | |
| 2002/0131604 A1 * | 9/2002 | Amine | H04R 29/004 381/58 |

(Continued)

FOREIGN PATENT DOCUMENTS

WO      2014182334 A1    11/2014

OTHER PUBLICATIONS

Patel et al., "Speech Recognition System for Windows Commands," International Journal of Computer Applications, International Conference on Recent Trends in Engineering & Technology, 2013, pp. 31-35.

(Continued)

*Primary Examiner* — Michael Colucci
(74) *Attorney, Agent, or Firm* — Zilka-Kotab, P.C.

(57) ABSTRACT

A computer-implemented method, according to one embodiment, includes: receiving a complex audio signal which includes an intended audio signal and at least one interfering audio signal. Moreover, the intended audio signal is a voice-based command originating from a user. Information which corresponds to the at least one interfering audio signal is also received. The received information is used to identify portions of the complex audio signal as being the at least one interfering audio signal. Furthermore, the identified portion of the complex audio signal is removed from the complex audio signal, and a remaining portion of the complex audio signal is output.

18 Claims, 12 Drawing Sheets

(56) References Cited

U.S. PATENT DOCUMENTS

| | | | |
|---|---|---|---|
| 2006/0190255 A1* | 8/2006 | Fukada | G10L 15/22 704/251 |
| 2008/0091406 A1* | 4/2008 | Baldwin | G10L 25/63 704/4 |
| 2011/0054900 A1* | 3/2011 | Phillips | G10L 15/30 704/235 |
| 2011/0161080 A1 | 6/2011 | Ballinger et al. | |
| 2012/0008760 A1* | 1/2012 | Berkowitz | H04Q 3/66 379/221.14 |
| 2014/0182518 A1* | 7/2014 | Boehm | A01K 31/007 119/429 |
| 2014/0344687 A1 | 11/2014 | Durham et al. | |
| 2015/0025882 A1 | 1/2015 | Park | |
| 2015/0179184 A1* | 6/2015 | Cudak | G10L 21/0208 704/233 |
| 2015/0221300 A1* | 8/2015 | Sukhomlinov | G10L 15/08 704/246 |
| 2015/0348551 A1* | 12/2015 | Gruber | G10L 15/28 704/235 |
| 2016/0161946 A1* | 6/2016 | Wuth Sepulveda | G05D 1/0022 701/2 |
| 2016/0350609 A1 | 12/2016 | Mason et al. | |
| 2017/0140760 A1* | 5/2017 | Sachdev | G10L 17/06 |
| 2017/0243577 A1* | 8/2017 | Wingate | G10L 15/20 |
| 2018/0053506 A1* | 2/2018 | Konuma | G10L 15/22 |
| 2019/0272818 A1* | 9/2019 | Fernandez | G10L 13/047 |
| 2019/0318725 A1* | 10/2019 | Le Roux | G10L 15/063 |
| 2019/0341034 A1* | 11/2019 | Dunning | G10L 15/02 |

OTHER PUBLICATIONS

Healy et al., "An algorithm to improve speech recognition in noise for hearing-impaired listeners," The Journal of the Acoustical Society of America, vol. 134, No. 4, Oct. 2013, 17 pages retrieved from https://www.ncbi.nlm.nih.gov/pmc/articles/PMC3799726/.

Otermat et al., "Analysis of the FM Radio Spectrum for Secondary Licensing of Low-Power Short-Range Cognitive Internet of Things Devices," IEEE Access, Digital Object Identifier, vol. 4, Nov. 8, 2016, pp. 6691-6691 retrieved from https://ieeexplore.ieee.org/stamp/stamp.jsp?arnumber=7587389.

Braga, M., "People Are Complaining That Amazon Echo Is Responding to Ads on TV," Motherboard, Dec. 4, 2015, 4 pages retrieved from https://motherboard.vice.com/en_us/article/53dz8x/people-are-complaining-that-amazon-echo-is-responding-to-ads-on-tv.

Liptak, A. "Amazon's Alexa started ordering people dollhouses after hearing its name on TV," The Verge, Jan. 7, 2017, 2 pages retrieved from https://www.theverge.com/2017/1/7/14200210/amazon-alexa-tech-news-anchor-order-dollhouse.

* cited by examiner

FILTERING AUDIO-BASED INTERFERENCE FROM VOICE COMMANDS USING INTERFERENCE INFORMATION

BACKGROUND

The present invention relates to signal processing, and more specifically, this invention relates to filtering audio-based interference from voice commands.

An increasing number of electrical based products support voice-activated functionality, thereby allowing users to initiate action simply by vocalizing their intent. As a result, users are able to interact with these voice-activated products without providing any physical inputs, such as pressing buttons, flipping switches, or even using a touch screen. Initial voice-activated products were limited in the number and complexity of functions they were able to provide. However, as this technology continues to advance, so does the intricacy of the functions that voice-activated products are able to perform for their users.

As a result, voice-activated products continue to be exposed to new arrays of audible inputs having varied complexity. The frequency at which voice commands are received from users also continues to increase. Further still, the increased intricacy of supported functions has introduced voice-activated products to a greater number of environmental settings. Accordingly, the amount and type of background noise that voice-activated products are forced to distinguish from actual voice commands has intensified as well.

SUMMARY

A computer-implemented method, according to one embodiment, includes: receiving a complex audio signal which includes an intended audio signal and at least one interfering audio signal. Moreover, the intended audio signal is a voice-based command originating from a user. Information which corresponds to the at least one interfering audio signal is also received. The received information is used to identify portions of the complex audio signal as being the at least one interfering audio signal. Furthermore, the identified portion of the complex audio signal is removed from the complex audio signal, and a remaining portion of the complex audio signal is output.

A computer-implemented method, according to another embodiment, includes: receiving a complex audio signal which includes an intended audio signal and at least one interfering audio signal. Moreover, the intended audio signal is a voice-based command originating from a user. The complex audio signal converted into text which represents a plurality of words included in the complex audio signal, and information which corresponds to the at least one interfering audio signal is received. The received information is used to identify at least some of the text as representing words which correspond to the at least one interfering audio signal, and the identified text is discarded. Furthermore, a remaining portion of the text is output.

A computer program product, according to yet another embodiment, includes a computer readable storage medium having program instructions embodied therewith. The computer readable storage medium is not a transitory signal per se. Moreover, the program instructions are readable and/or executable by a controller to cause the controller to perform a method which includes: receiving, by the controller, a complex audio signal which includes an intended audio signal and at least one interfering audio signal. The intended audio signal is also a voice-based command originating from a user. Moreover, the complex audio signal is converted, by the controller, into text which represents a plurality of words included in the complex audio signal, and information which corresponds to the at least one interfering audio signal is received by the controller. The received information is used, by the controller, to identify at least some of the text as representing words which correspond to the at least one interfering audio signal. Furthermore, the identified text discarded, by the controller; and a remaining portion of the text is also output, by the controller.

Other aspects and embodiments of the present invention will become apparent from the following detailed description, which, when taken in conjunction with the drawings, illustrate by way of example the principles of the invention.

DETAILED DESCRIPTION

Figure 1:
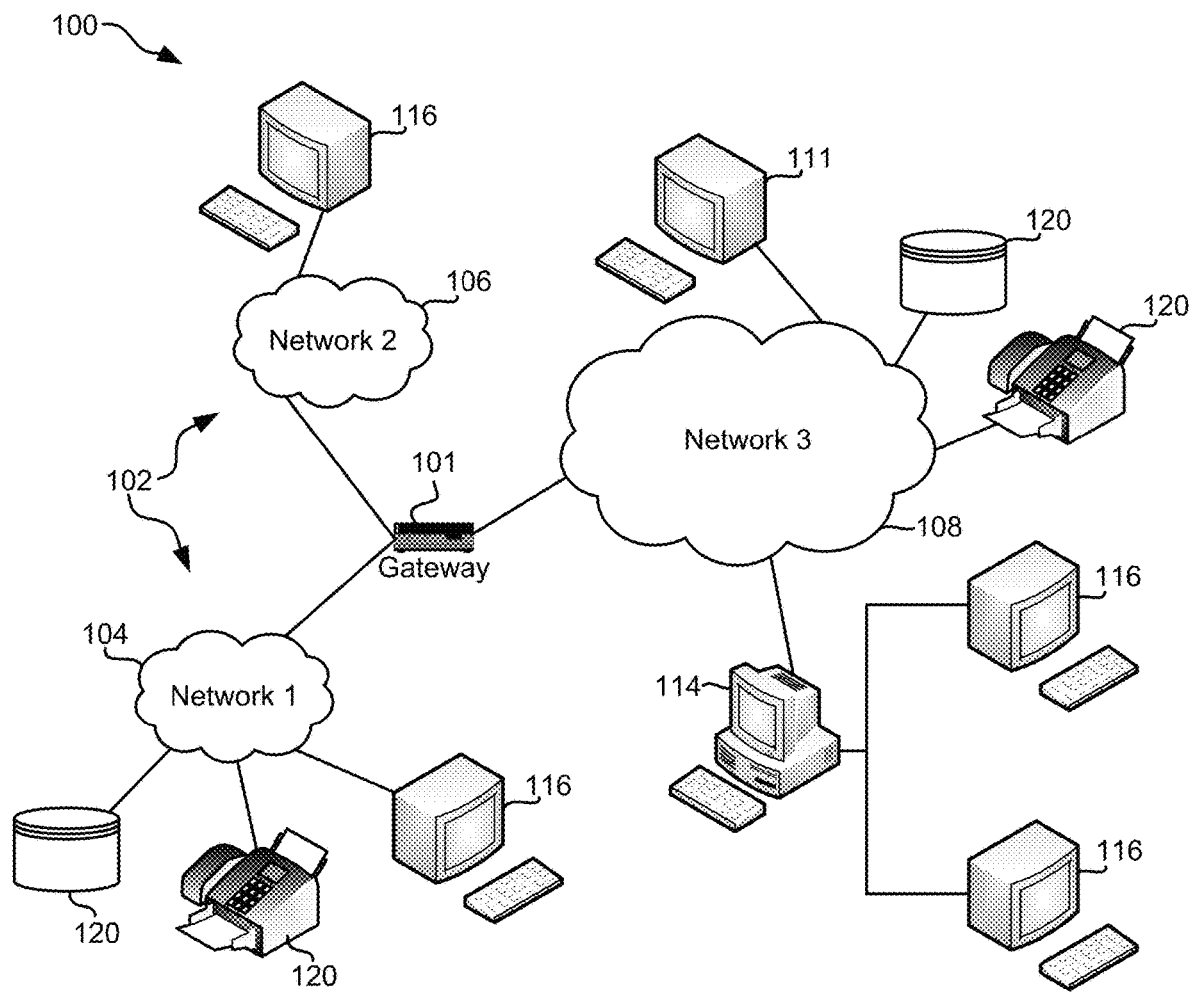
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for removing background noise from received audio signals at a level of accuracy and efficiency which has not been conventionally achievable. As a result, the accuracy by which user-based commands may ultimately be satisfied is significantly increased. Moreover, these improvements are achieved without introducing any processing delay into the process of interpreting received audio signals. These achievements may also be implemented in a number of different contextual settings (e.g., system architectures), thereby increasing the breadth over which the improvements are experienced. For instance, some of the embodiments included herein may be implemented in a cloud-based system which is able to provide improved performance to a plurality of users in a plurality of different locations, e.g., as will be described in further detail below.

In one general embodiment, a computer-implemented method includes: receiving a complex audio signal which includes an intended audio signal and at least one interfering audio signal. Moreover, the intended audio signal is a voice-based command originating from a user. Information which corresponds to the at least one interfering audio signal is also received. The received information is used to identify portions of the complex audio signal as being the at least one interfering audio signal. Furthermore, the identified portion of the complex audio signal is removed from the complex audio signal, and a remaining portion of the complex audio signal is output.

In another general embodiment, a computer-implemented method includes: receiving a complex audio signal which includes an intended audio signal and at least one interfering audio signal. Moreover, the intended audio signal is a voice-based command originating from a user. The complex audio signal converted into text which represents a plurality of words included in the complex audio signal, and information which corresponds to the at least one interfering audio signal is received. The received information is used to identify at least some of the text as representing words which correspond to the at least one interfering audio signal, and the identified text is discarded. Furthermore, a remaining portion of the text is output.

In yet another general embodiment, a computer program product includes a computer readable storage medium having program instructions embodied therewith. The computer readable storage medium is not a transitory signal per se. Moreover, the program instructions are readable and/or executable by a controller to cause the controller to perform a method which includes: receiving, by the controller, a complex audio signal which includes an intended audio signal and at least one interfering audio signal. The intended audio signal is also a voice-based command originating from a user. Moreover, the complex audio signal is converted, by the controller, into text which represents a plurality of words included in the complex audio signal, and information which corresponds to the at least one interfering audio signal is received by the controller. The received information is used, by the controller, to identify at least some of the text as representing words which correspond to the at least one interfering audio signal. Furthermore, the identified text discarded, by the controller; and a remaining portion of the text is also output, by the controller.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
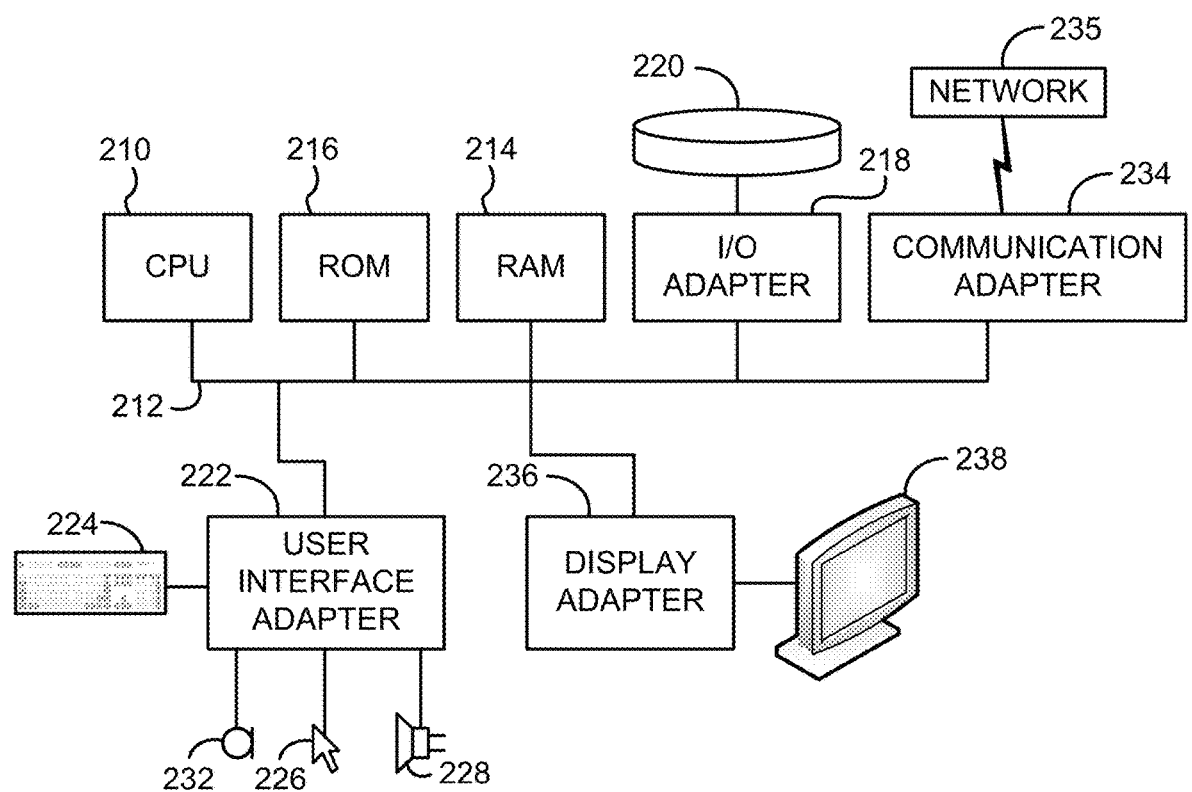
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

The type and/or organization of memory which is implemented at various locations of a storage architecture to store data may vary depending on the desired approach. For instance, in some approaches the memory implemented at a node of the storage architecture may include a single drive of a single type of memory, multiple drives of the same type of memory, multiple drives having different types of memory, etc. According to an illustrative approach, the memory implemented at a node of a storage architecture may include multiple drives of different types of memory, the multiple drives being organized in a multi-tiered storage system embodiment. For instance, referring to FIG. 3, a multi-tiered data storage system 300 is shown according to one embodiment. Note that some of the elements shown in FIG. 3 may be implemented as hardware and/or software, according to various embodiments.

The storage system 300 is depicted as including a storage system manager 312 which may be used to communicate with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

Figure 3:
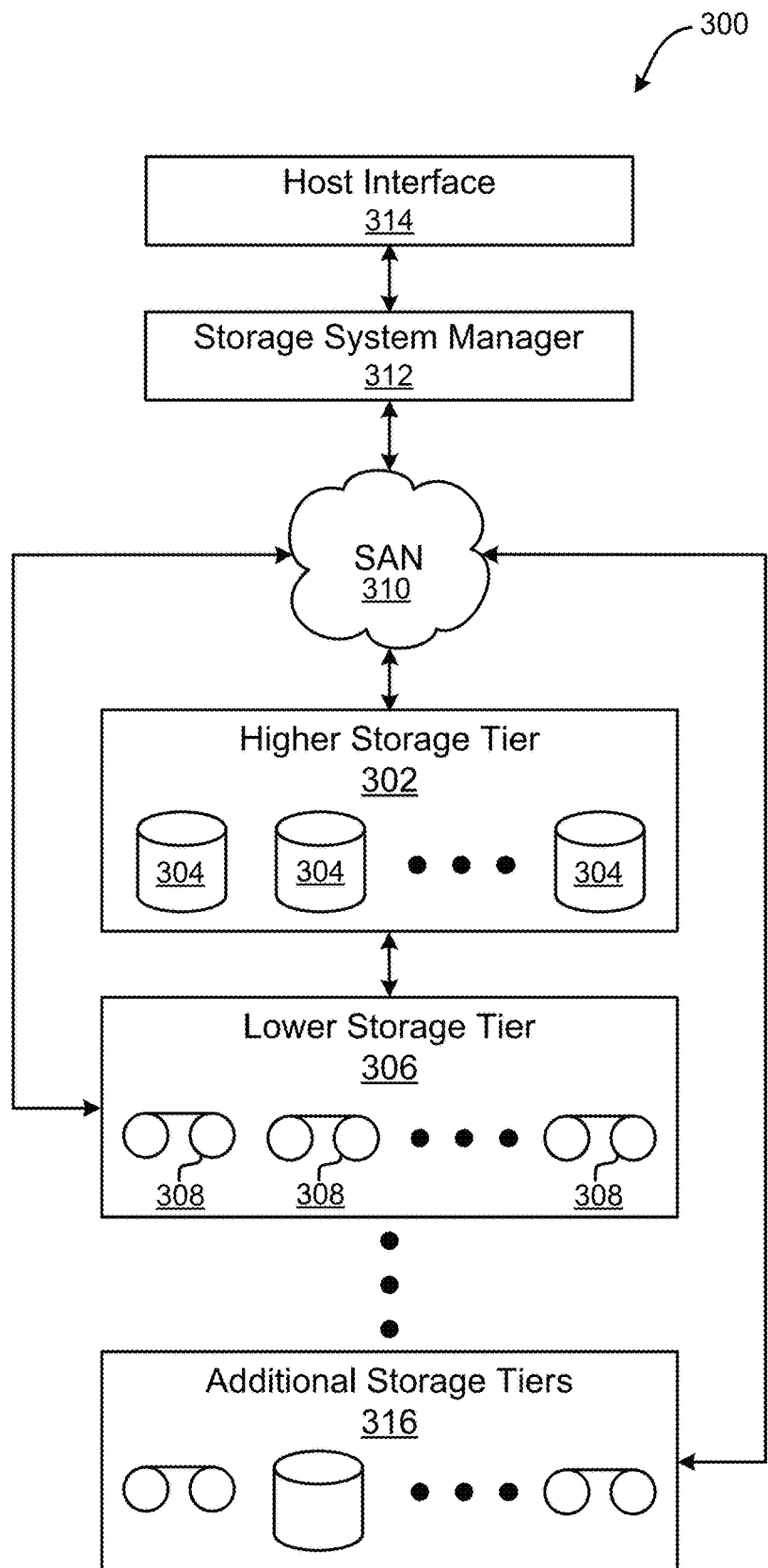
FIG. 3 illustrates a tiered data storage system in accordance with one embodiment.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions. Of course, this logic may be implemented as a method on any device and/or system or as a computer program product, according to various embodiments.

As previously mentioned, an increasing number of electrical based products support voice-activated functionality, thereby allowing users to initiate action simply by vocalizing their intent. However, as this technology continues to advance, so does the intricacy of the functions that voice-activated products are able to perform for their users. As a result, voice-activated products continue to be exposed to new arrays of audible inputs having varied complexity. Further still, the increased intricacy of supported functions has introduced voice-activated products to a greater number of environmental settings, thereby increasing the amount and type of background noise that voice-activated products are forced to distinguish from actual voice commands.

Conventional voice-activated products have proven to be particularly susceptible to background noise and have experienced a significant reduction in the effectiveness by which incoming audible signals are interpreted as a result. This is particularly undesirable in the realm of voice-activated functionality, as misinterpreted instructions often lead to an inability to respond, or even unintended actions being executed.

In sharp contrast to the foregoing shortcomings experienced by conventional voice-activated products, various ones of the embodiments included herein are able to achieve significant improvements to the filtering of audio-based interference from voice commands. As a result, some of the embodiments described below are able to increase the efficiency and accuracy by which voice commands are interpreted. This also directly causes improvements to the efficiency by which voice-activated products are able to operate, thereby providing a unique solution to an existing issue prevalent in conventional products, e.g., as will be described in further detail below.

Figure 4:
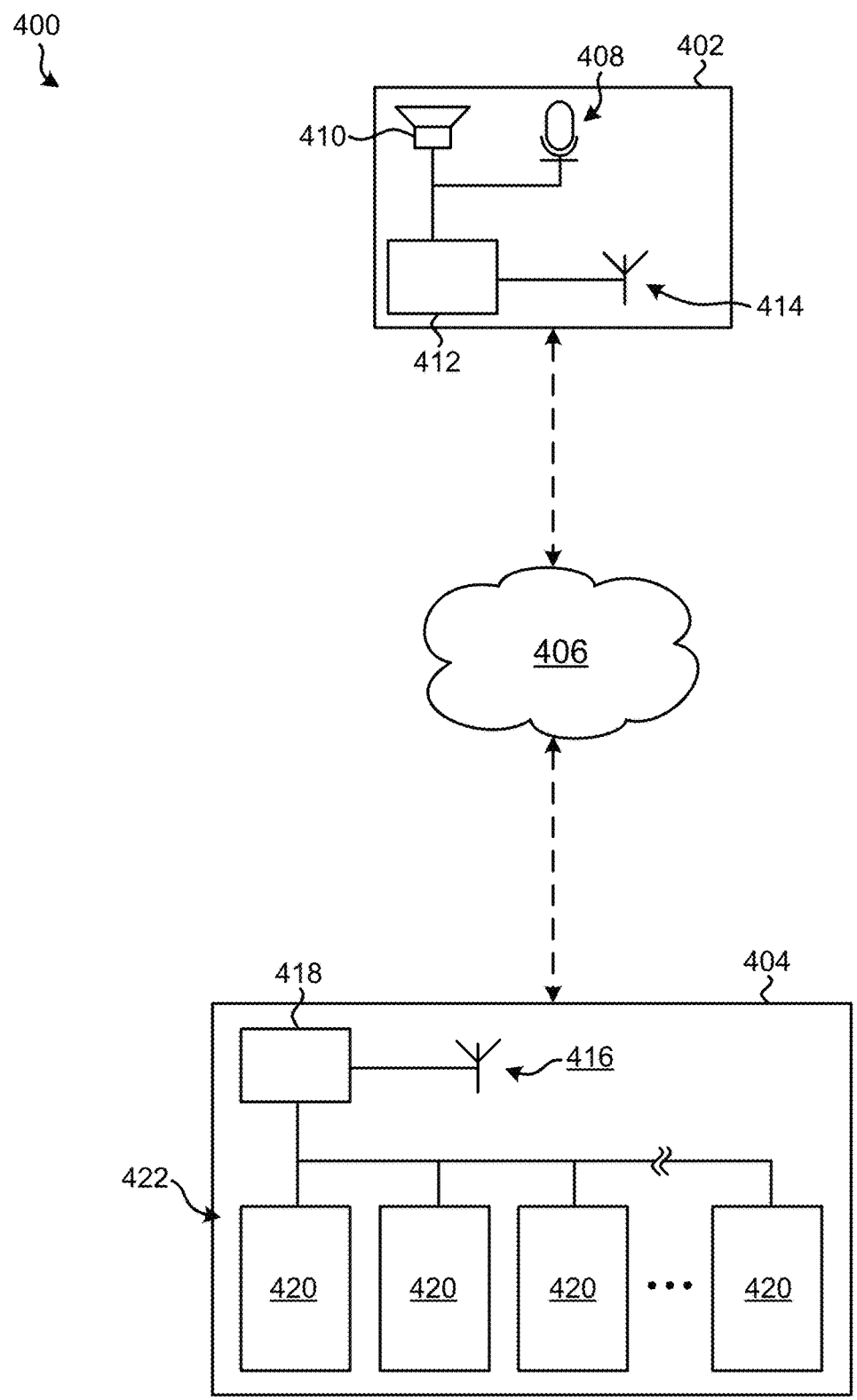
FIG. 4 is a partial representational view of a system in accordance with one embodiment.

Looking to FIG. 4, a system 400 is illustrated in accordance with one embodiment. As an option, the present system 400 may be implemented in conjunction with features from any other embodiment listed herein, such as those described with reference to the other FIGS. However, such system 400 and others presented herein may be used in various applications and/or in permutations which may or may not be specifically described in the illustrative embodiments listed herein. Further, the system 400 presented herein may be used in any desired environment. Thus FIG. 4 (and the other FIGS.) may be deemed to include any possible permutation.

As shown, the system 400 includes a user integrated device 402 having voice-activated capabilities, which is connected to a processing location 404 through a network 406. It should be noted that the user integrated device 402 and/or the processing location 404 may be connected to the network 406 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Moreover, the network 406 may be of any desired type, e.g., such as a SAN, LAN, WAN, etc. Accordingly, one or more user integrated devices 402 may be coupled to a processing location 404 by a cloud-based architecture. Moreover, this cloud-based relationship may be applied to any of the approaches described and/or suggested herein, e.g., as would be appreciated by one skilled in the art after reading the present description.

Looking to the user integrated device 402, a microphone 408 and a speaker 410 are coupled to a controller 412. The microphone 408 may be capable of detecting and receiving audible signals having a variety of different frequencies, e.g., as would be appreciated by one skilled in the art. In some approaches, the microphone 408 may be limited to detecting audible signals which are in a frequency range that humans are able to hear and/or produce, e.g., while speaking. According to an example, which is in no way intended to limit the invention, the microphone 408 may be limited to detecting audible signals which are in a frequency range of about 20 Hertz (Hz) to about 20 kHz, but may be able to detect audible signals having higher and/or lower frequencies depending on the desired approach. The microphone 408 is also preferably able to convert received audible signals into electrical audio signals which may be sent to the controller 412, e.g., as would be appreciated by one skilled in the art.

The speaker 410 is preferably able to produce audible signals of varying frequency. Accordingly, the speaker 410 may be able to output any desired type of audible signal, e.g., such as automated speech in order to interact with a user, music, notifications, interactive feedback, etc. The audible signals output by the speaker 410 may correspond to electrical audio signals received from the controller 412. Accordingly, the speaker 410 may be able to convert electrical audio signals into audible signals, e.g., as would be appreciated by one skilled in the art.

The controller 412 is further coupled to an antenna 414 which may be used to connect the user integrated device 402 to the network 406. However, it should be noted that in some approaches the user integrated device 402 may be connected to the network 406 by one or more physical electrical connections as noted above.

Looking to the processing location 404, an antenna 416 may be used to receive signals, data, commands, requests, etc. from a variety of other components which may be connected to the network 406, e.g., such as the user integrated device 402. Accordingly, the antenna 416 may also be used to send (e.g., transmit) signals, data, commands, requests, etc. to any of the other components which may be connected to the network 406, e.g., such as the user integrated device 402.

The antenna 416 is coupled to a controller 418, which in turn is coupled to a plurality of memory components 420 in a storage array 422. Accordingly, the controller 418 may read data from and/or write data to any of the memory components 420 in the storage array 422. Moreover, the memory components 420 may include any desired type of memory, e.g., such as SSDs, HDDs, magnetic tape libraries, etc., and/or combinations thereof. Moreover, although only one storage array 422 is illustrated in the present embodiment, it should be noted that any number of different storage arrays may be implemented, e.g., as a portion of a multi-tiered storage system (e.g., as seen in FIG. 3 above).

It follows that the controller 418 may be used to process audio signals received by the user integrated device 402 and provide outputs which correspond to the received signals. However, the audio signals received by the controller 418 may be complex in that they include noise in addition to an intended audio signal. Accordingly, the controller 418 is preferably able to implement a variety of signal processing procedures which preferably filter out the noise from these complex audio signals, e.g., such as those described in methods 500, 600, and 700 below.

Figure 5A:
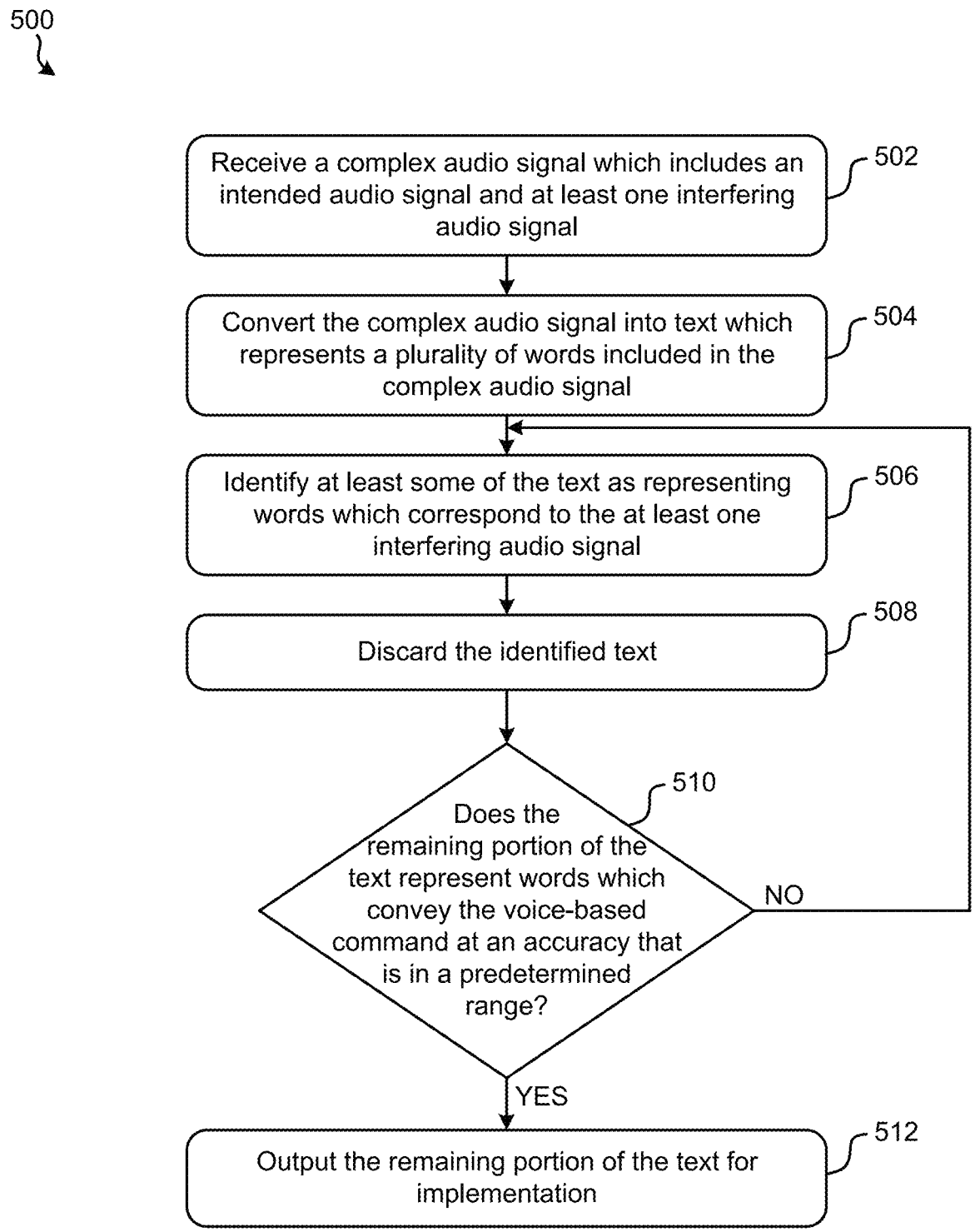
FIG. 5A is a flowchart of a method in accordance with one embodiment.

Referring now to FIG. 5A, a flowchart of a method 500 for processing complex audio signals is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, one or more of the various processes included in method 500 may be performed by the controller 418 of FIG. 4. However, in various other embodiments, the method 500 may be partially or entirely performed by a controller, a processor, a computer, etc., or some other device having one or more processors therein. Thus, in some embodiments, method 500 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes receiving a complex audio signal which includes an intended audio signal and at least one interfering audio signal. According to some approaches, the complex audio signal may be received from a user integrated device, e.g., such as that illustrated in FIG. 4 above. Accordingly, the intended audio signal may be a voice-based audio command which originated from a user which interacted with (spoken within range of) the user integrated device.

Moreover, operation 504 includes converting the complex audio signal into text which represents a plurality of words included in the complex audio signal. In other words, operation 504 includes converting the complex audio signal from the "audio domain" into the "word domain" such that the complex audio signal is represented as text, or equivalent forms of information, e.g., such as logical "1s" and "0 s". It should be noted that, according to the present description, the "audio domain" may essentially correspond to situations in which an audio signal (e.g., the input) is represented as a series of audio waves. In other words, the complex audio signal may be represented by one or more analog and/or digital representations of the identified audio signals. However, the "word domain" may correspond to a situation in which an audio signal represented in the audio domain is converted into text which represents a set of words, e.g., by using speech-to-text algorithms as will be described in further detail below. According to various approaches, the conversion performed in operation 504 may be performed using any desired spoken language parsing techniques known in the art.

Operation 506 further includes identifying at least some of the text as representing words which correspond to the at least one interfering audio signal. It follows that operation 506 involves identifying the portions of the text which do not represent the intended audio signal. Moreover, by removing these identified portions, method 500 is able to achieve a better interpretation of the intended audio signal, e.g., as will be described in further detail below.

Figure 5B:
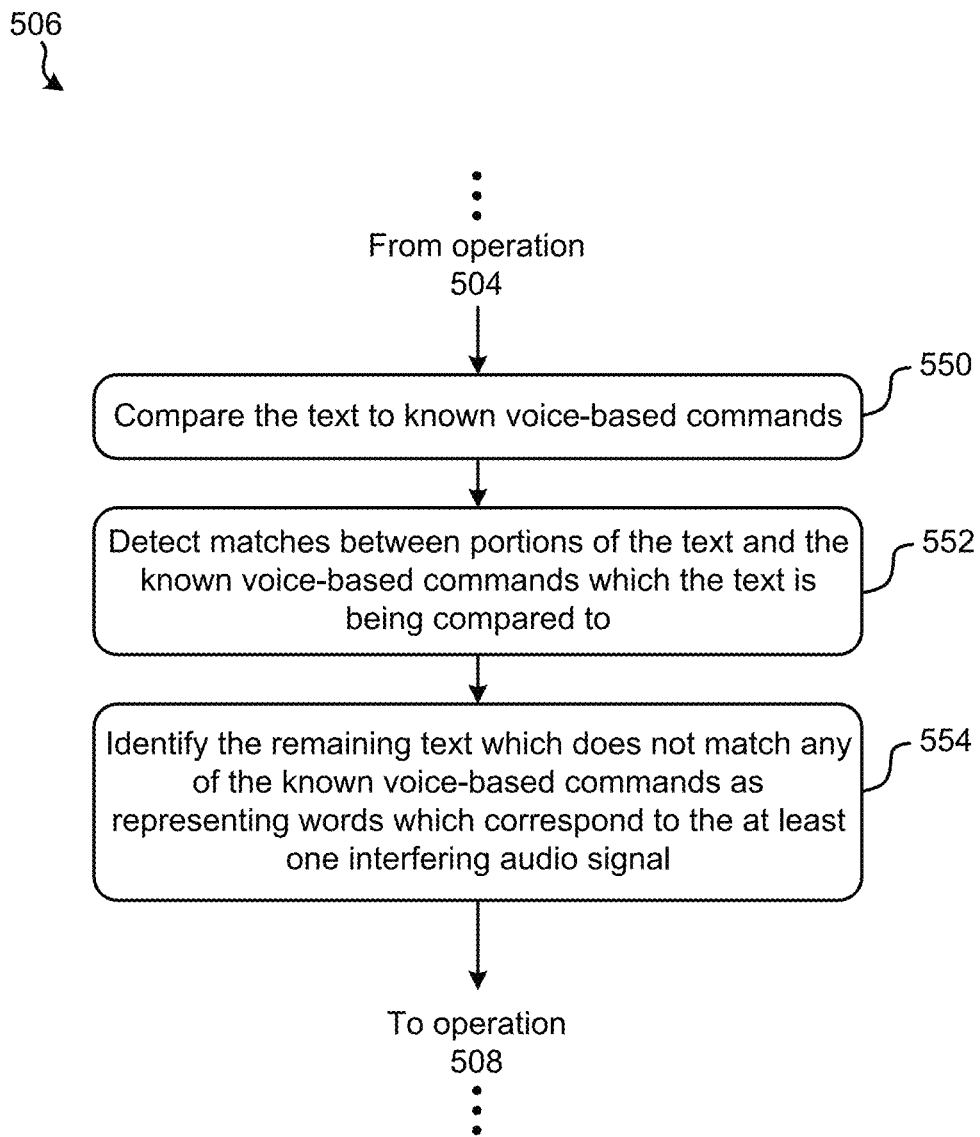
FIG. 5B is a flowchart of sub-processes for one of the operations in the method of FIG. 5A, in accordance with one embodiment.
Figure 5C:
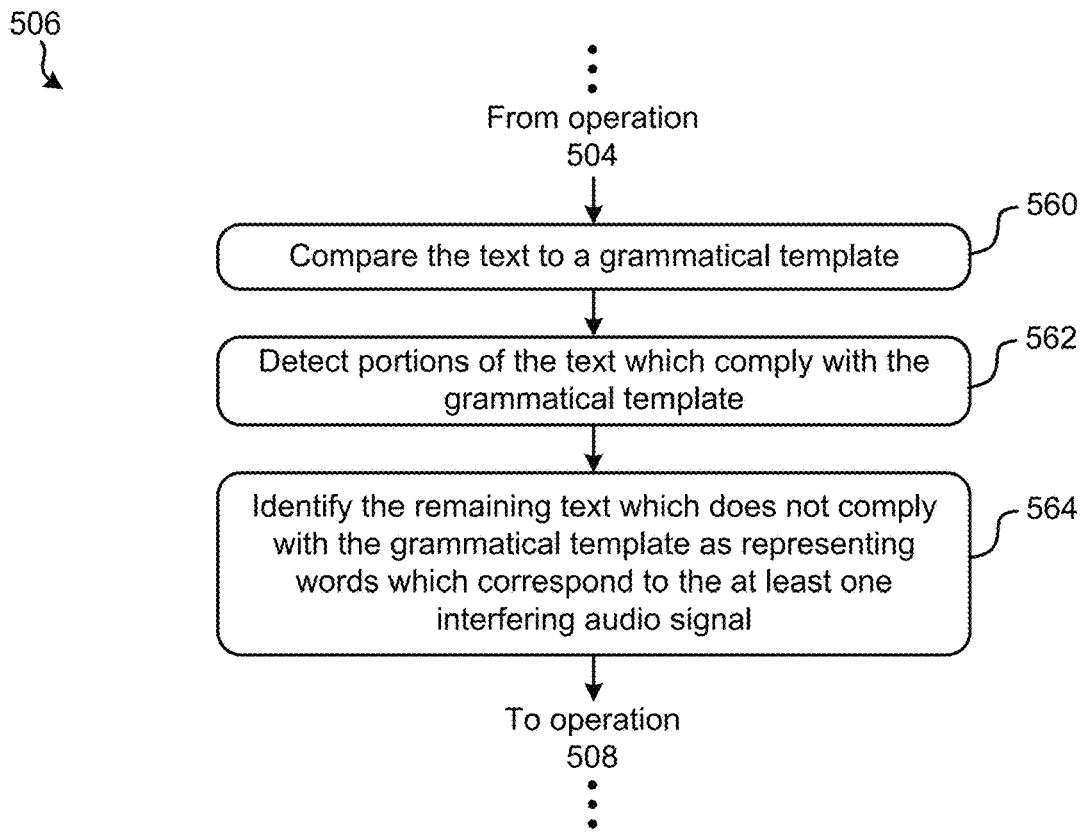
FIG. 5C is a flowchart of sub-processes for one of the operations in the method of FIG. 5A, in accordance with one embodiment.
Figure 5D:
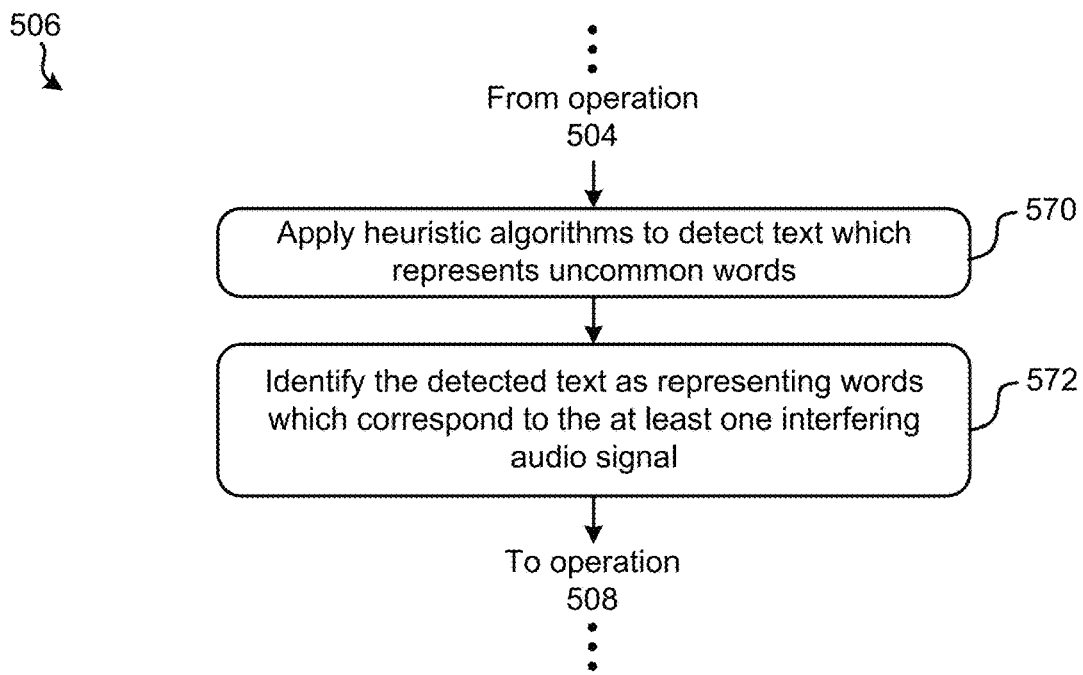
FIG. 5D is a flowchart of sub-processes for one of the operations in the method of FIG. 5A, in accordance with one embodiment.

Identifying portions of the text which do not represent the intended audio signal may be achieved in a number of different ways. For example, some approaches may identify these portions of the text by applying one or more natural language processing techniques to the text. These one or more natural language processing techniques may desirably be able to identify which portions of the text correspond to the intended audio signal (e.g., voice-based command), and which portions of the text correspond to the at least one interfering audio signal (e.g., background noise). Referring momentarily to FIGS. 5B-5D, exemplary sub-processes of several natural language processing techniques are illustrated in accordance with one embodiment, one or more of which may be used to perform operation 506 of FIG. 5A. However, it should be noted that the sub-processes included in each of FIGS. 5B-5D are illustrated in accordance with different embodiments respectively, which are in no way intended to limit the invention.

Looking first to FIG. 5B, applying a natural language processing technique to the text includes comparing the text to known voice-based commands. See sub-operation 550. In other words, sub-operation 550 includes comparing the text to a set of known or previously logged commands which may be stored in memory. According to some approaches, this comparison may be performed by applying a clustering algorithm, such as the k-nearest neighbors algorithm, to the text, e.g., as would be appreciated by one skilled in the art after reading the present description. However, other types of instance-based learning functions or classification functions may be applied to the text depending on the desired approach.

Referring still to FIG. 5B, sub-operation 552 includes detecting matches (e.g., similarities) between portions of the text and the known voice-based commands which the text is being compared to. It follows that the manner in which matches are detected in sub-operation 552 may depend, at least somewhat, on the process(es) implemented in sub-operation 550 to compare the text to known voice-based commands. For instance, in some approaches detecting the matches in sub-operation 552 may include evaluating an outcome of an instance-based learning function (e.g., k-nearest neighbors algorithm) which was applied to the text.

Moreover, sub-operation 554 includes identifying the remaining text which does not match any of the known voice-based commands as representing words which correspond to the at least one interfering audio signal. In other words, the text identified as corresponding to known voice-based commands may be interpreted as being associated with the intended audio signal. Accordingly, any remaining text which did not match the known voice-based commands may be identified as being associated with the at least one interfering audio signal.

Accordingly, the sub-processes included in FIG. 5B may be able to identify portions of the text which represent words which correspond to the at least one interfering audio signal. As mentioned above, this identified text may be removed from the complex audio signal received, thereby providing a better understanding of the intended audio signal and improving performance, e.g., as will be described in further detail below.

Looking now to FIG. 5C, sub-operation 560 includes comparing the text to a grammatical template, while sub-operation 562 includes detecting portions of the text which comply with the grammatical template. A grammatical template may provide a general structure which describes the different segments that are typically included in voice-based commands. Thus, a grammatical template may assist in identifying portions of the text which are aligned with the structure of a voice-based command, and which portions differ therefrom.

According to an example, which is in no way intended to limit the invention, a grammatical template which represents the different segments typically included in a voice-based command may be as follows: <action> <noun> <location>. Thus, the text may be compared to the foregoing grammatical template in order to identify words which convey an action, followed by words which are nouns, and finally words which identify a location. The text identified as representing these types of words in this order may thereby be identified as corresponding to the intended audio signal, while the remaining text which does not comply (e.g., match) the grammatical template may be identified as corresponding to the at least one interfering audio signal. Accordingly, sub-operation 564 includes identifying the remaining text which does not comply with the grammatical template as representing words which correspond to the at least one interfering audio signal.

It should be noted that more than one grammatical template may be applied to the text, e.g., in order to filter the text in greater detail. Moreover, natural language understanding processes (e.g., such as Bluemix available from IBM having a sales address at 1 New Orchard Road, Armonk, N.Y. 10504) may also be applied to the text in order to further identify concepts, semantic roles, parts of speech, etc., which may further improve the accuracy by which the text may be compared (e.g., mapped) to one or more grammatical templates. Accordingly, natural language understanding processes may optionally be implemented in the flowchart of FIG. 5C in some approaches.

Other types of templates which would be apparent to one skilled in the art after reading the present description may also be applied to the text in other approaches. For instance, the text identified as matching the grammatical template in sub-operation 562 may further be evaluated in some approaches. According to some approaches, the portions of the text which are detected as complying with the grammatical template may be compared to a database of commands. The database may include previously received commands, frequent commands, commands associated with metadata corresponding to the complex audio signal (e.g., a time of day, geographic location, synced calendar information, etc.). Results of the comparison may be evaluated, and those which are determined as being a most likely (e.g., closest) match may be identified as representing words which correspond to the intended audio signal. However, it should also be noted that in some approaches a database of known, reoccurring, user-identified, predicted, etc. interfering audio signals may be used to identify portions of the text which correspond to the one or more interfering audio signals. Moreover, these identified portions of the one or more interfering audio signals may be used to deduce which portions of the text correspond to the intended audio signal, e.g., as would be appreciated by one skilled in the art after reading the present description.

Accordingly, the sub-processes included in FIG. 5C may be able to identify portions of the text which represent words which correspond to the at least one interfering audio signal. As mentioned above, this identified text may be removed from the complex audio signal received, thereby providing a better understanding of the intended audio signal and improving performance, e.g., as will be described in further detail below.

Moving to FIG. 5D, the flowchart includes applying heuristic algorithms to detect text which represents uncommon words. See sub-operation 570. In some approaches, sub-operation 570 may be performed by using the heuristic algorithms to compare the text to a word bank. The word bank may include a plurality of words which are used (e.g., received and detected) frequently enough that they are considered to be "common", at least in comparison to words which are used less frequently and considered to be "uncommon". Accordingly, text which does not match any of the entries in the word bank may be identified as representing words which correspond to the at least one interfering signal. However, the word back may include a plurality of uncommon words in other approaches. Accordingly, any matches between the text and the word bank may be identified as representing words which correspond to the at least one interfering signal. It should be noted that "common" and "uncommon" words may be determined based on historical use, user pre-specifications, subject area, a type of user integrated device, etc. In addition, pairs, triplets or other sets of words may be evaluated to understand how common or uncommon it is for a given pair, triplet, or set of words to be together.

According to an in-use example, which is in no way intended to limit the invention, the word "dog" is received as a part of a complex audio signal and is determined as being part of the intended audio signal, e.g., using any of the approaches described herein. Looking to the words included in the word domain representation of the complex audio signal, "dog" is followed by the words "record" and "walk". Accordingly, an analyzation of how often the words "dog" and "record" (e.g., <dog, record>) appear together in voice-based commands which are received and/or which appear in a database, as well as how often the words "dog" and "walk" (e.g., <dog, walk>) appear together. Moreover, this information may be used for comparison purposes such that an accurate representation of the intended audio signal (voice-based command) is processed. It follows that, according to the present example, "record" may be noise included in the at least one interfering signals, while "walk" corresponds to the intended audio signal, because <dog, record> appears less often compared to <dog, walk>.

Sub-operation 572 further includes identifying the detected text as representing words which correspond to the at least one interfering audio signal. It follows that the sub-processes included in FIG. 5D may be able to identify portions of the text which represent words which correspond to the at least one interfering audio signal. As mentioned above, this identified text may be removed from the complex audio signal received, thereby providing a better understanding of the intended audio signal and improving performance.

Accordingly, returning to FIG. 5A, operation 508 includes discarding the text identified in operation 506. In other words, the portions of the text identified in operation 506 as representing words which correspond to the at least one interfering signal are preferably discarded, and thereby removed from the remaining portion of the text. According to some approaches, the identified text may be discarded by erasing it from memory, marking the corresponding data as invalid, removing it from further analysis, etc.

Decision 510 includes determine whether the remaining portion of the text represents words which convey the voice-based command at an accuracy that is in a predetermined range. As mentioned above, the intended audio signal may be a voice-based audio command which originated from a user. Accordingly, decision 510 includes determining whether a remaining portion of the text represents the intended audio signal at a sufficient level of accuracy. For example, decision 510 may determine whether the remaining portion of the text represents the intended audio signal at an accuracy of 95% or better. It should be noted that "in a predetermined range" is in no way intended to limit the invention. Rather than determining whether a value is above in a predetermined range, equivalent determinations may be made, e.g., as to whether a value is above a predetermined threshold, whether a value is outside a predetermined range, whether an absolute value is above a threshold, whether a value is below a threshold, etc., depending on the desired approach.

The determination made in decision 510 may be made in response to further evaluation which is performed on the remaining portion of the text. According to some approaches, decision 510 may be determined by comparing the remaining portion of the text to a database of known commands having no interference (e.g., noise) and evaluating the similarities therebetween. This comparison may thereby provide information which represents an accuracy by which the remaining portion of the text conveys the intended audio signal portion of the originally received complex audio signal. In other approaches, a binary representation of the accuracy by which the remaining portion of the text conveys the intended audio signal may be implemented. In still other approaches, an accuracy may be derived from how closely the remaining portion of the text matches a template (e.g., a grammatical template, command template, etc., as described above).

Method 500 is shown as proceeding to operation 512 in response to determining that the remaining portion of the text represents words which convey the voice-based command at an accuracy which is in the predetermined range. In other words, method 500 may proceed to operation 512 in response to determining that the remaining portion of the text represents the intended audio signal at a sufficient level of accuracy. It follows that method 500 may essentially be permitted to exit a recursive performance loop in response to determining that an edited phrase or command matches the deduced command (e.g., intent) included in the originally received complex audio signal. There, operation 512 includes outputting the remaining portion of the text for actual implementation.

Once the intended audio signal has been identified from the complex audio signal which was originally received, action may be taken to satisfy the voice-based command which may be conveyed in the intended audio signal. Thus, the voice-based command may be interpreted and actually implemented. As described above, one or more of the processes included in method 500 may be performed by a controller at a processing location, e.g., as seen in FIG. 4. Accordingly, operation 512 may include sending one or more commands, data, information, etc. to a user integrated device from which the complex audio signal was originally received.

In some approaches the remaining portion of the text may be evaluated as-is. In other words, operation 512 may attempt to interpret the remaining portion of the text in whatever form, order, grammatical structure, etc. it may be in. However, in some approaches the remaining portion of the text may be compared to a database of known (e.g., previously received, understood, supported, etc.) commands. The known command which matches the remaining portion of the text most closely may thereby be selected and output (implemented) for use.

Returning to decision 510, method 500 is depicted as returning to operation 506 in response to determining that the remaining portion of the text represents words which convey the voice-based command at an accuracy which is not in the predetermined range. In other words, method 500 returns to operation 506 in response to determining that the remaining portion of the text represents the intended audio signal at an insufficient (e.g., undesirably low) level of accuracy. Accordingly, operation 506 may be repeated in an attempt to identify additional portions of the remaining text as representing words which correspond to the at least one interfering audio signal. Moreover, operation 508 may also be repeated to remove any identified additional portions of the text before repeating decision 510. Accordingly, processes 506, 508, 510 may be repeated in an iterative fashion until a remaining portion of the text is represents the intended audio signal at a sufficient level of accuracy.

It follows that the various embodiments described above are able to remove background noise from received complex audio signals at a level of accuracy and efficiency which has not been conventionally achievable. As a result, the accuracy by which user-based commands may ultimately be satisfied is significantly increased. Moreover, these improvements are achieved without introducing any processing delay into the process of interpreting received audio signals.

Although various ones of the embodiments described above with respect to method 500 involve processing complex audio signals simply by evaluating the content of the signals themselves and/or textual representations thereof, complex audio signals may be processed using other processes in other embodiments. For instance, supplemental information which corresponds to the received complex audio signal may be received and used to perform the signal processing. For instance, referring now to FIG. 6A, a flowchart of a method 600 for processing complex audio signals is shown according to one embodiment. The method 600 may be performed in accordance with the present invention in any of the environments depicted in FIGS. 1-4, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, one or more of the various processes included in method 600 may be performed by the controller 418 of FIG. 4. However, in various other embodiments, the method 600 may be partially or entirely performed by a controller, a processor, a computer, etc., or some other device having one or more processors therein. Thus, in some embodiments, method 600 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Figure 6A:
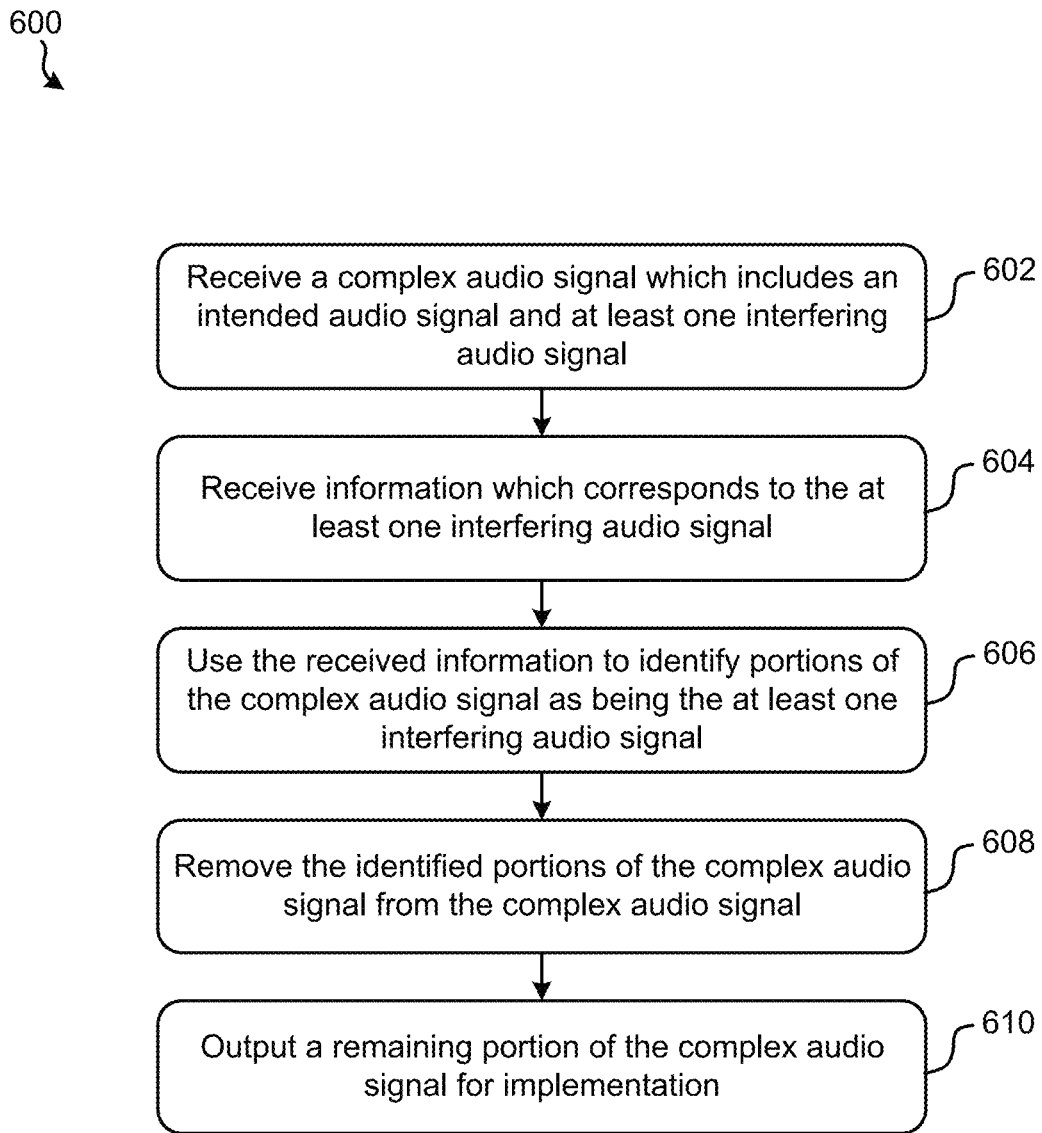
FIG. 6A is a flowchart of a method in accordance with one embodiment.

As shown in FIG. 6A, operation 602 of method 600 includes receiving a complex audio signal which includes an intended audio signal and at least one interfering audio signal. According to some approaches, the complex audio signal may be received from a user integrated device, e.g., such as that illustrated in FIG. 4 above. Accordingly, the intended audio signal may be a voice-based audio command which originated from a user which interacted with (spoken within range of) the user integrated device.

Moreover, operation 604 includes receiving information which corresponds to the at least one interfering audio signal. Although the type of information received may vary depending on the approach, the information itself may be used to better identify the at least one interfering audio signal. In other words, the information received may be used to increase the accuracy and efficiency by which interfering audio signals included in the complex audio signal may be detected. Accordingly, operation 606 includes using the received information to identify portions of the complex audio signal as being the at least one interfering audio signal. The manner in which the received information is used in operation 606 may also vary depending on the type of information, e.g., as will soon become apparent.

As mentioned above, the type of information received in operation 604 may vary depending on the approach. However, in preferred approaches the received information includes a timestamp which corresponds to the intended audio signal. For instance, the timestamp may identify a time within the interfering audio signal that the intended audio signal (e.g., voice-based command) was originated. In other words, although the timestamp corresponds to the intended audio signal, the timestamp is preferably relative to the interfering content itself. According to an example, which is in no way intended to limit the invention, a user may be watching a movie while issuing a voice-based command. Thus, the audio signals produced by a speaker which is functioning in unison with a visual output component (e.g., screen) which is displaying the visual portion of the movie may interfere with the voice-based command issued by the user. The timestamp may thereby represent an offset time which corresponds to a portion of the movie which was playing at the time the voice-based command was issued, e.g., as would be appreciated by one skilled in the art after reading the present description.

In some situations, audio signals which precede the start of the intended audio signal may be recorded, e.g., in order to avoid clipping or missing a first portion of the intended audio signal. Accordingly, this time stamp may provide valuable information which allows for portions of the complex audio signal which do not correspond with a time that the intended audio signal was originated to be easily ignored. In other approaches, the timestamp may identify a time that the intended audio signal was terminated (ended). Again, a user integrated device may continue to capture audio signals even after the intended audio signal is no longer detected. For instance, the intended audio signal may be a voice-based command, whereby a user integrated device may continue to scan for additional portions of the voice-based command for a predetermined amount of time, even after it is no longer detected. This may allow for the user integrated device to avoid misinterpreting pauses, interruptions, speaking volume dips, etc. in the intended audio signal as an end of the voice-based command. Accordingly, the timestamp may again be used to ignore portions of the complex audio signal which do not correspond with a time that the intended audio signal is determined to have ended.

The information received in operation 604 may also include known content which corresponds to the at least one interfering audio signal in some approaches. With respect to the present description, "known content" may include any type of information which is known about the one or more interfering audio signals. For instance, the known content may include an actual full copy of the interfering audio signal(s), and/or a live stream of the interfering audio signal(s) in some approaches. According to an example, which is in no way intended to limit the invention, voice-based command may have been collected (e.g., recorded) from a user by a user integrated device which is also exposed to an environment in which a show is playing on a television and music is being played through a speaker system. Thus, the information received in operation 604 may include an actual full copy (e.g., a downloadable video file) of the television show which is playing in the background, as well as a live stream (e.g., a streaming audio file) of the particular song which is being played through the speaker system, and/or combinations thereof. In other approaches, rather than sending a full and/or partial copy of a particular song, movie, television show, etc., the information received may simply describe the song, movie, television show, etc., with some degree of accuracy. For instance, the name, cast, release date, run time, director, unique identifier (e.g., season and episode number), etc., song, movie, television show, etc. may be received in operation 604. As a result, the various other operations included in method 600 may be performed while reducing the amount of data that is being received and/or transmitted, thereby increasing system performance by conserving resources without sacrificing efficiency.

It follows that the user integrated device may be connected (e.g., aware of) and communicate with other devices in the surrounding environment, e.g., over a wireless network, a Bluetooth connection, near field communication, etc., as well as applications, programs, functions, etc. which are running on these other devices. According to an example, which is in no way intended to limit the invention, content based information may be extracted from and/or received from a device which is running one or more user applications. Once equipped with a copy of the television show and at least a portion of the song which was playing while the voice-based command was issued, this known information may be used to efficiently and accurately identify the interfering audio signals. Moreover, the interfering audio signals which have been identified may be removed from the complex audio signal, thereby producing a more accurate and clear representation of the voice-based command.

The received information may additionally include an offset which identifies a portion of the content which produced the at least one interfering audio signal at the time that the voice-based command was originated. In other words, in some approaches the received information may include timing based information which may be used to better identify which portion of the content likely produced the interfering audio signal. Returning to the above example, an offset identifying which portion of the full copy (e.g., a downloadable video file) of the television show which was playing in the background during the period of time that the voice-based command was received. Moreover, another offset may identify which portion of the live stream (e.g., a streaming audio file) of the particular song which was being played through the speaker system during the period of time that the voice-based command was received. Accordingly, the audio signal which corresponds to the identified portion of the television show and the audio signal which corresponds to the identified portion of the song may be compared to the complex audio signal in order to identify portions thereof which are background noise and not part of the voice-based command, e.g., as would be appreciated by one skilled in the art after reading the present description.

Figure 6B:
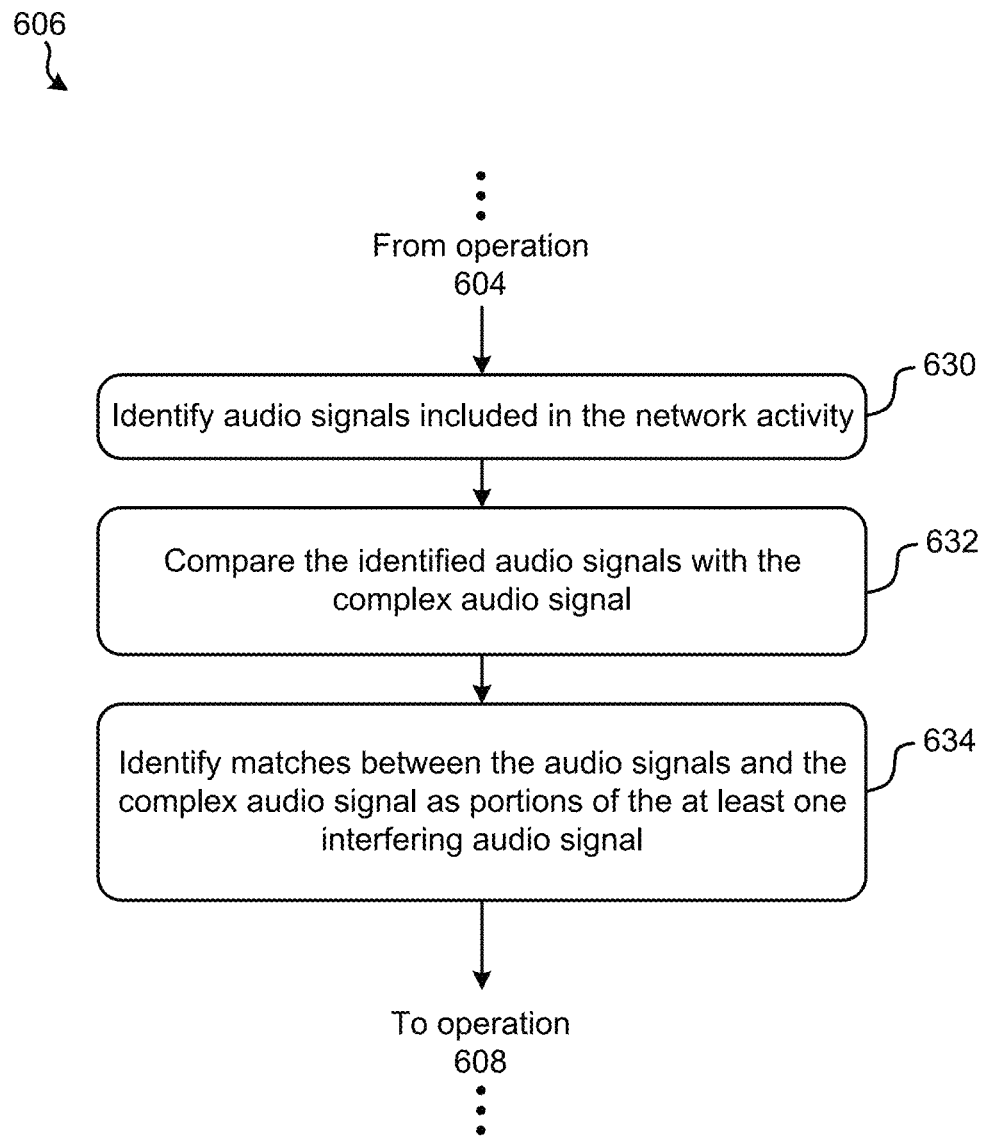
FIG. 6B is a flowchart of sub-processes for one of the operations in the method of FIG. 6A, in accordance with one embodiment.

In other approaches, the information received in operation 604 may include network activity experienced by a network router which corresponds to a user which issued the voice-based command included in the complex audio signal. In other words, the network activity experienced by a network router which is within range of a location of the user. Accordingly, the network activity which was directed through a network router, or network compatible devices (e.g., smart televisions, tablets, computers, etc.) during a same or similar time as a timestamp associated with the intended audio signal may be used to identify portions of the complex audio signal which correspond to the at least one interfering audio signal. Referring momentarily to FIG. 6B, exemplary sub-processes of using the received information to identify portions of the complex audio signal as being the at least one interfering audio signal are illustrated in accordance with one embodiment, one or more of which may be used to perform operation 606 of FIG. 6A above. However, it should be noted that the sub-processes of FIG. 6B are illustrated in accordance with one embodiment which is in no way intended to limit the invention.

As shown, the flowchart of FIG. 6B includes identifying audio signals included in the network activity. See sub-operation 630. According to some approaches, the data being transferred in the network activity may be examined in order to determine whether any audio signals are included therein. In other approaches, network addresses (e.g., internet addresses) being accessed in the network activity may be examined in order to determine whether any audio signals are produced, or at least are available, at those addresses. However, any other processes of identifying audio signals which are included in network activity which would be apparent to one skilled in the art after reading the present description may be implemented.

Referring still to FIG. 6B, sub-operation 632 includes comparing the audio signals identified in sub-operation 630 with the complex audio signal. In some approaches, the identified audio signals may be compared with the complex audio signal in the audio domain. Thus, an analog and/or a digital representation of the identified audio signals may be compared to an analog and/or a digital representation of the complex audio signal in an effort to identify similarities (e.g., matches) therebetween. However, in other approaches the audio signals may be converted into the word domain prior to being compared. In other words, the identified audio signals may be converted into text along with the complex audio signal, and the text corresponding to each of the audio signals may be compared in order to identify similarities (e.g., matches) therebetween.

It follows that any matches determined between the identified audio signals and the complex audio signal may correspond to the at least one interfering audio signal included in the complex audio signal. Accordingly, sub-operation 634 includes identifying matches between the audio signals and the complex audio signal as portions of the at least one interfering audio signal.

In still other approaches, the information received in operation 604 may include audio samples collected from one or more other users at about the time that the voice-based command was originated. Moreover, these audio samples are also preferably collected from one or more users which are actually located at, or at least near, the area (e.g., location) that the user which originated the voice-based command is located. As a result, the collected audio samples may capture the same or similar portions of environmental (e.g., ambient) noise which may be producing the at least one interfering audio signal in the complex audio signal which was originally received. For example, audio samples may be collected from users which are located at a same venue (e.g., concert, sporting event, play, speech, etc.), a same location (e.g., tourist attraction, public park, airport, etc.), etc.

The multiple different audio samples may thereby be compared against each other and/or the complex audio signal in order to identify similarities therebetween. Any such similarities may be interpreted as being the at least one interfering audio signal, thereby providing valuable information which may be used to perform signal processing and better identify the intended audio signal. It should also be noted that users which are located in or near the location that the user which originated the voice-based command is located may be identified using any processes which would be apparent to one skilled in the art after reading the present description. For instance, location information received from various user integrated devices may be analyzed in order to determine relative distances between users.

Figure 6C:
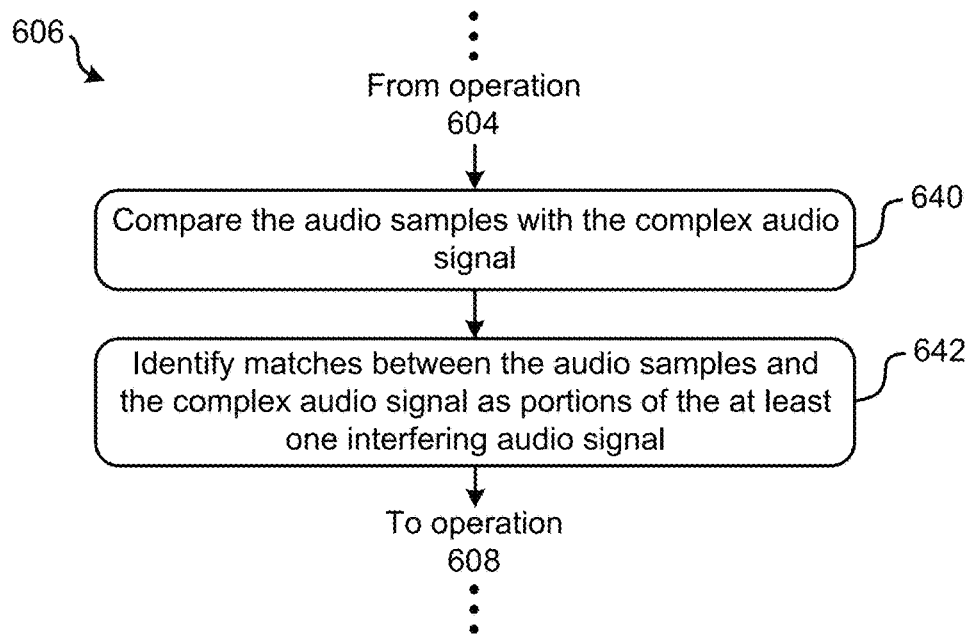
FIG. 6C is a flowchart of sub-processes for one of the operations in the method of FIG. 6A, in accordance with one embodiment.

As mentioned above, the collected audio samples may be used to identify portions of the complex audio signal which correspond to the at least one interfering audio signal. Referring momentarily to FIG. 6C, exemplary sub-processes of using the collected audio samples to identify portions of the complex audio signal as being the at least one interfering audio signal are illustrated in accordance with one embodiment, one or more of which may be used to perform operation 606 of FIG. 6A above. However, it should be noted that the sub-processes of FIG. 6C are illustrated in accordance with one embodiment which is in no way intended to limit the invention.

As shown, the flowchart of FIG. 6C includes comparing the audio samples with the complex audio signal. See sub-operation 640. In some approaches, the audio samples may be compared with the complex audio signal in the audio domain. Thus, an analog and/or a digital representation of the audio samples may be compared to an analog and/or a digital representation of the complex audio signal in an effort to identify similarities (e.g., matches) therebetween. However, in other approaches the audio samples may be converted into the word domain prior to being compared. In other words, the audio samples may be converted into text along with the complex audio signal, and the text corresponding to each of the audio samples may be compared with each other and/or the text corresponding to the complex audio signal in order to identify similarities (e.g., matches) therebetween.

It follows that any matches determined between the audio samples and the complex audio signal may correspond to the at least one interfering audio signal included in the complex audio signal. Accordingly, sub-operation 642 includes identifying matches between the audio samples and the complex audio signal as portions of the at least one interfering audio signal. Depending on the approach, the matches which are identified may correspond to common and/or equivalent background voices, similar audio noise detected amongst co-timed commands, etc.

In yet other approaches, the information received in operation 604 may include a second complex audio signal which includes the intended audio signal and at least a second interfering audio signal. According to an example, which is in no way intended to limit the invention, voice-based commands may be received from a number of different users over time. It follows that at least some of the voice-based commands may be combined (e.g., recorded) with the same or similar background noise which produces the same or similar interfering audio signals. This may be particularly true in situations where a certain user submits the same voice-based command two or more times in relatively quick succession. Thus, similarities in the interfering signals and/or similarities in the voice-based command may be identified by comparing more than one complex audio signal to each other.

Figure 6D:
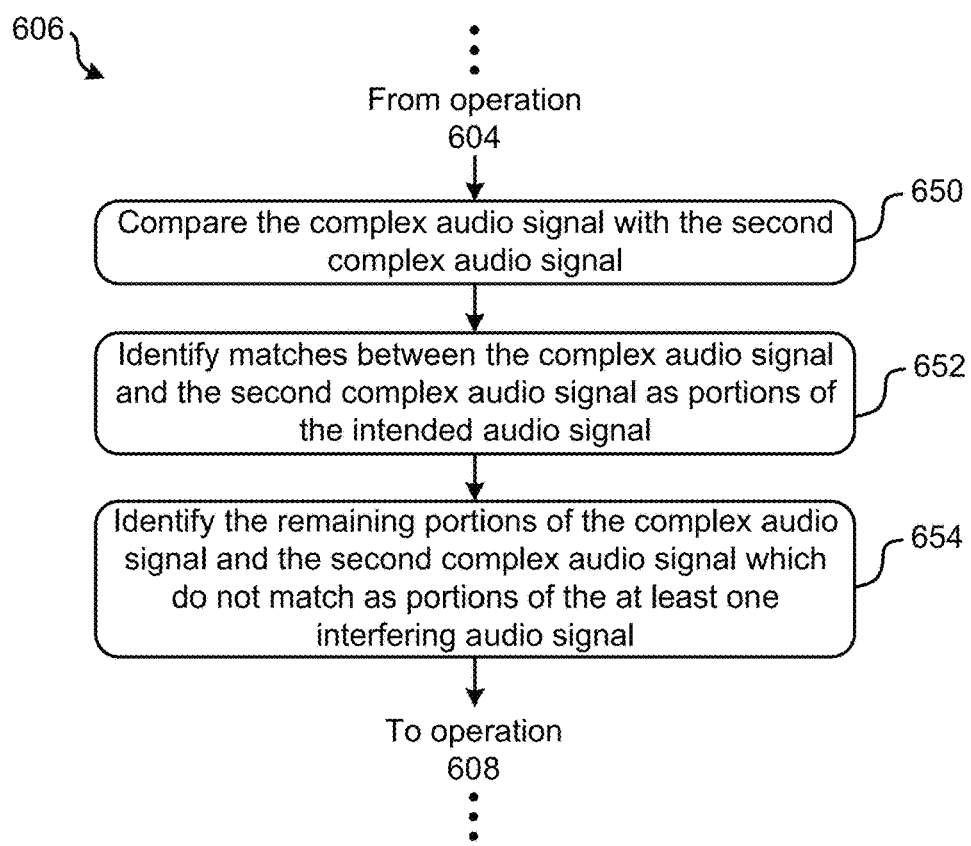
FIG. 6D is a flowchart of sub-processes for one of the operations in the method of FIG. 6A, in accordance with one embodiment.

Referring momentarily now to FIG. 6D, exemplary sub-processes of using the second complex audio signal to identify portions of the complex audio signal as being the at least one interfering audio signal are illustrated in accordance with one embodiment, one or more of which may be used to perform operation 606 of FIG. 6A above. However, it should be noted that the sub-processes of FIG. 6D are illustrated in accordance with one embodiment which is in no way intended to limit the invention.

As shown, the flowchart of FIG. 6D includes comparing the complex audio signal with the second complex audio signal. See sub-operation 650. As mentioned above, audio signal comparisons may be performed in the audio domain and/or the word domain. Thus, an analog and/or a digital representation of the second complex audio signal may be compared to an analog and/or a digital representation of the complex audio signal in an effort to identify similarities (e.g., matches) therebetween. Yet in other approaches the complex audio signal and the second complex audio signal may be converted into the word domain prior to being compared. In other words, the complex audio signal and the second complex audio signal may both be converted into text, and the text corresponding to the complex audio signal may be compared with the text corresponding to the second complex audio signal in order to identify similarities (e.g., matches) therebetween.

As previously mentioned, a certain user may submit the same voice-based command two or more times in relatively quick succession. Accordingly, similarities in the interfering signals and/or similarities in the voice-based command may be identified by comparing the complex audio signals to each other. Looking to sub-operation 652, FIG. 6D includes identifying matches between the complex audio signal and the second complex audio signal as portions of the intended audio signal. Once portions of the intended audio signal have been identified from the complex audio signal, the remaining portions of the complex audio signal may be identified as being portions or the at least one interfering audio signal. Accordingly, sub-operation 654 includes identifying the remaining portions of the complex audio signal and the second complex audio signal which do not match as portions of the at least one interfering audio signal. Sub-operations 652 and 654 may be performed using any signal processing techniques which would be apparent to one skilled in the art after reading the present description. For instance, the identified portions of the intended audio signal may be used to filter out the at least one interfering audio signal from the complex audio signal in the audio domain and/or the word domain.

Figure 6E:
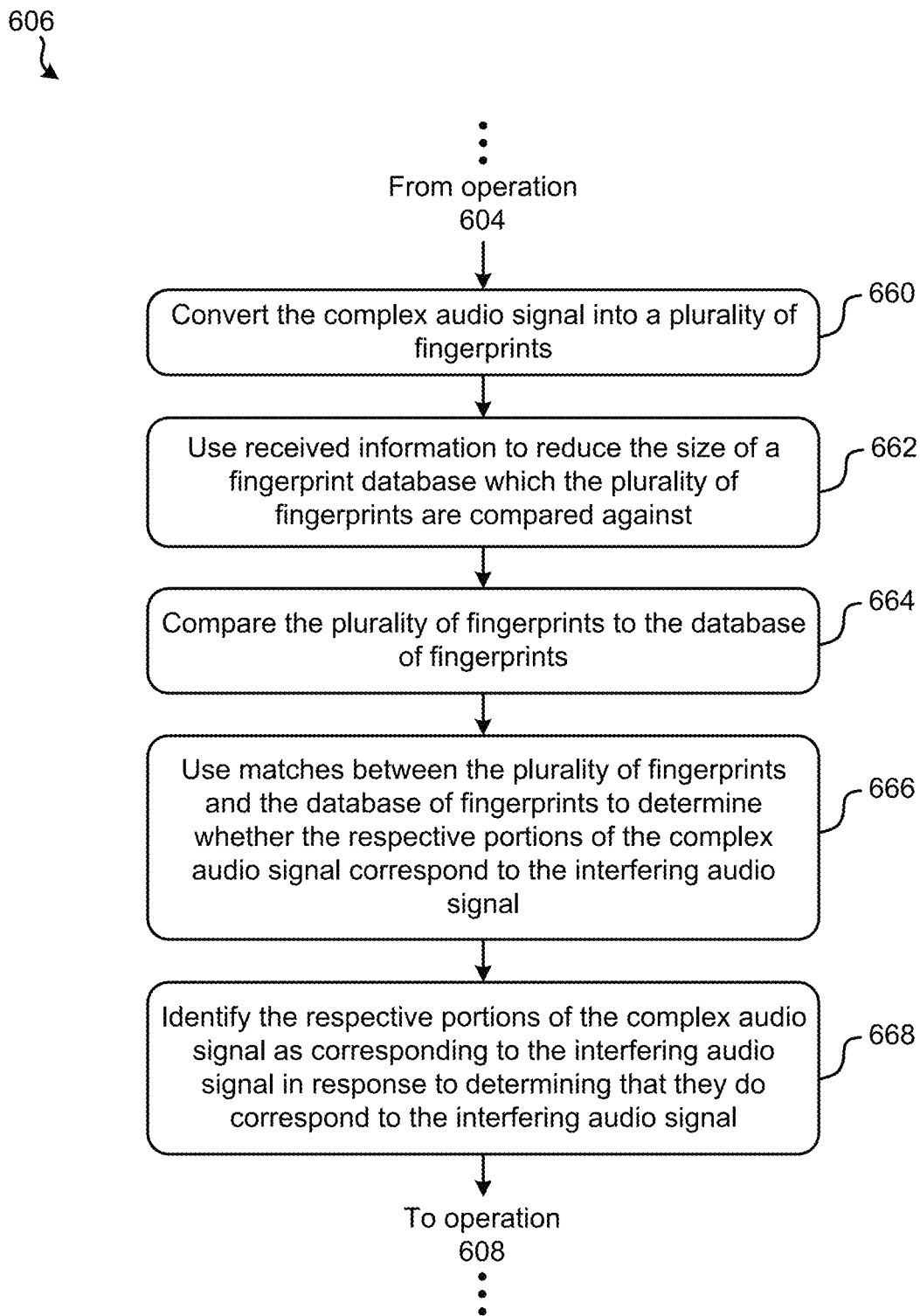
FIG. 6E is a flowchart of sub-processes for one of the operations in the method of FIG. 6A, in accordance with one embodiment.

Looking now to FIG. 6E, exemplary sub-processes of using the received information to identify portions of the complex audio signal as being the at least one interfering audio signal are illustrated in accordance with another embodiment, one or more of which may be used to perform operation 606 of FIG. 6A above. However, it should be noted that the sub-processes of FIG. 6E are illustrated in accordance with one embodiment which is in no way intended to limit the invention.

As shown, the flowchart of FIG. 6E includes converting the complex audio signal into a plurality of fingerprints. See sub-operation 660. Each of these fingerprints may provide a condensed digital summary of an audio sample which corresponds to a certain portion of the complex audio signal. Moreover, each of these acoustic fingerprints may represent a portion of only one of the audio signals included in the complex audio signal. It follows that these acoustic fingerprints may be used to identify a given audio sample and/or efficiently locate a similar audio sample which may be stored in an audio database.

These acoustic fingerprints may be formed using a fingerprint algorithm which is able to convert the complex audio signal into the acoustic fingerprints. According to some approaches, the acoustic fingerprint algorithm may be robust enough to take into account the perceptual characteristics of the audio signals from which the fingerprints are being formed. For instance, if two audio signals or files sound alike to a user, the acoustic fingerprints corresponding to each or the audio signals preferably match, even if their binary representations are somewhat different. However, the plurality of fingerprints may be formed using any processes which would be apparent to one skilled in the art after reading the present description.

As mentioned above, the acoustic fingerprints may be used to identify a given audio sample and/or efficiently locate a similar audio sample which may be stored in an audio database. However, audio databases may include a vast number of fingerprints in some approaches. Accordingly, it may be desirable to reduce the size of the database which the fingerprints are compared against in the interest of reducing processing delays, raising productivity, increasing efficiency, etc. Sub-operation 662 includes using the information received in operation 604 to reduce the size of a fingerprint database which the plurality of acoustic fingerprints are compared against.

Depending on the type of information that was received, the size of the database may be reduced based on contextual information (e.g., location, activity, etc.) corresponding to a user which issued at least a portion of the complex audio signal, content preferences (e.g., previously registered actions), active queues, applications which are installed and/or currently running on a device which issued at least a portion of the complex audio signal, etc. It follows that sub-operation 662 is preferably performed prior to actually comparing the fingerprints to the database, but in some approaches sub-operation 662 may not be performed prior to performing the comparison, or even not at all. Therefore, sub-operation 662 may be optional in some approaches.

Referring still to FIG. 6E, sub-operation 664 includes comparing the plurality of fingerprints to the database of fingerprints which represent known audio signals. As mentioned above, in some approaches the size of the database which the plurality of fingerprints are compared to may be reduced. Accordingly, the plurality of fingerprints may only be compared to an amount of the database which corresponds to the size determined in sub-operation 662. Moreover, any desired processes may be implemented to perform the comparison in sub-operation 664. For instance, in some approaches each of the plurality of fingerprints may be compared to each of the entries in the database until either a match is identified, or the database entries have been exhausted. In other approaches, each of the plurality of fingerprints may be compared to a lookup table which represents at least a portion of each of the entries in the database. In still other approaches, each of the plurality of fingerprints may be compared to each of the entries in the database until either a match is identified, or the database entries have been exhausted, whereby any reductions in the size of the fingerprint database may be removed, and the plurality of fingerprints may be compared to the entries which were previously excluded from consideration.

Sub-operation 666 also includes using matches between the plurality of fingerprints and the database of fingerprints to determine whether the respective portions of the complex audio signal correspond to the interfering audio signal. According to some approaches, this determination may be made by performing more detailed analysis of the portions of the complex audio signal. For instance, the portions of the complex audio signal which correspond to the matched fingerprints may be compared to grammatical templates, exposed to heuristic algorithms, compared with common words and/or phrases, etc., or any one of the various approaches described herein. Moreover, this additional analysis may be performed in the audio domain and/or the word domain, e.g., depending on the desired approach. Moreover, sub-operation 668 includes identifying the respective portions of the complex audio signal as corresponding to the interfering audio signal in response to determining that they do correspond to the interfering audio signal.

Accordingly, the flowchart included in FIG. 6E may be able to identify interfering audio content using a fingerprinting mechanism and/or by guiding a fingerprinting mechanism using information which corresponds to the user and/or user integrated device(s) which may have produced the interfering audio content, e.g., the source of the interfering audio content. It follows that contextual information may be sent with audio signals to influence performance of the fingerprinting mechanism in order to reduce the search space and significantly reduce processing times. In some approaches this contextual information may correspond to the user which issued a voice-based command. For instance, the contextual information may include information known about the user and/or the environment in which the user is located, e.g., such as an identity of the user, the geographical location of the user, the type of environment in which the user is located (e.g., the inside of an automobile, a specific room in a building, a subway car, etc.), an emotional state of the user, repeated patterns of the user, etc. Accordingly, this contextual information may provide valuable information which may be used to help identify the intended audio signal and/or filter out the one or more interfering audio signals. In other approaches, the contextual information may correspond to various user integrated devices which may be included in a same environment as the user which issued the intended audio signal (e.g., voice-based command). For instance, the contextual information may include information known about the user integrated device which initially recorded the complex audio signal and/or other user integrated devices positioned in a same environment that the user is located, e.g., such as applications which are currently running on the one or more user integrated devices, information corresponding to an application which currently has control of the speaker coupled to each of the respective user integrated devices, etc. Accordingly, this contextual information may provide valuable information which may be used to help identify the one or more interfering audio signals and/or deduce which portions of the complex audio signal corresponds to the intended audio signal.

According to an in-use example, which is in no way intended to limit the invention, a user may be riding in an automobile which has the radio playing at the same time that the user issues a voice-based command to a user integrated device. Thus, the voice-based command may be received at the user integrated device along with interfering audio signals produced by the speaker system of the automobile. Based on this contextual information, the user integrated device may first search databases which correspond to songs and/or podcasts, rather than databases which correspond to TV shows and/or movies. In other words, the user integrated device may be able to determine, based on received information, that it is more likely that the interfering audio signals correspond to a song and/or podcast than a TV show and/or movie. This determination may also be incorporated in the process of fingerprinting the interfering data. Other contextual information, e.g., such as applications which are currently running on the user integrated device and/or which are currently using the speaker system of the automobile. Moreover, SoundHound, Shazam, or any other audio fingerprinting related processes may be used to identify which song the interfering audio signal corresponds to, e.g., by creating and/or comparing fingerprints of the received interfering audio signal against a database of known songs.

This contextual information may further be used to determine an order which different portions of a fingerprint database are compared against the fingerprints that the complex audio signal is converted into. For example, the contextual information may indicate that the complex audio signal was recorded corresponding to a user issuing a voice-based command inside of an automobile. Accordingly, a portion of a fingerprint database which includes fingerprints derived from songs may be analyzed first. In response to not detecting any matches between this portion of the fingerprint database and the fingerprints that the complex audio signal is converted into, a portion of the fingerprint database which includes fingerprints derived from podcasts and/or talk shows may be analyzed next, and so on until a match is detected or the whole fingerprint database has been analyzed.

In still other approaches the actual content included in the complex audio signal may be used to improve functionality of the fingerprinting mechanism. For instance, the amplitude, frequency, cadence, randomness, etc., of the various portions of the complex audio signal may be used to determine a specific type of audio signals which may be included therein. For example, the presence of repeating audio signals having a same or similar frequency may be interpreted as corresponding to a song, while the presence of audio signals having a random frequency may be interpreted as corresponding to random background noise (e.g., grey noise). Accordingly, a result of this determination may be used to further narrow a portion of a fingerprint database which the fingerprints are compared against.

Returning now to FIG. 6A, operation 608 includes removing the portions of the complex audio signal identified in operation 606 from the complex audio signal. In other words, operation 608 includes removing the identified portions of the one or more interfering audio signals from the complex audio signal. Any desired processing procedures may be implemented in order to perform operation 608. For instance, in some approaches the identified portions of the complex audio signal may be removed from the complex audio signal in the audio domain by applying an adaptive filter which actively removes the identified portions. In other approaches the identified portions of the complex audio signal may be removed from the complex audio signal in the word domain by applying a logical operation (e.g., such as XOR) to text which represents the various words included in the complex audio signal. The logical operation may thereby simply discard the text which corresponds to the identified portions of the interfering signals. However, these approaches are in no way intended to limit the invention, but rather have been presented by way of example.

Furthermore, operation 610 includes outputting a remaining portion of the complex audio signal for actual implementation. In preferred approaches, the foregoing processes of method 600 are able to filter the originally received complex audio signal such that at least a majority of the interfering audio signals are removed, and the remaining portion of the complex audio signal includes the intended audio signal. In an ideal situation, each portion of the one or more interfering signals are removed from the complex audio signal, thereby producing only the intended audio signal. However, in some approaches, portions of the one or more interfering audio signals may also be included in the remaining portion of the originally received complex audio signal output in operation 610.

Although some of the one or more interfering audio signals may remain in the remaining portion of the complex audio signal output in operation 610, they may not have a negative effect on an ability to interpret the intended audio signal. Accordingly, a determination may be made in some approaches as to whether the remaining portion of the complex audio signal conveys the intended audio signal at an accuracy that is in a predetermined range. As mentioned above, the intended audio signal may be a voice-based audio command which originated from a user. Thus, this determination may include deciding whether a remaining portion of the complex audio signal represents the intended audio signal at a sufficient level of accuracy, e.g., according to any of the approaches described above. Various ones of the operations included in method 600 may also be repeated in response to determining that the remaining portion of the complex audio signal represents the intended audio signal at a sufficient level of accuracy.

As previously mentioned, the remaining portion of the complex audio signal is preferably output in operation 610 for actual implementation. In other words, the operations in method 600 may be implemented to derive an accurate and practicable representation of the intended audio signal. Thus, once the intended audio signal has been identified with sufficient accuracy, it may be submitted to a processor, sent to a control module, transmitted to one or more other components, etc., for implementation. Again, the intended audio signal may include a voice-based command. It follows that operation 610 may include outputting the remaining portion of the complex audio signal such that the voice-based command may actually be performed.

As reiterated above, various ones of the operations and sub-operations corresponding to method 600 may be performed in the audio domain and/or the word domain. Thus, although various ones of the approaches above are described in the context of the audio domain, it should be noted that the same or similar results may be achieved as a result of converting the audio signals into text. For instance, looking to FIG. 7, a method 700 for processing complex audio signals using the word domain is shown according to one embodiment. It should be noted that various ones of the operations included in method 700 have a number of similarities with operations included in methods 500 and 600 above. Accordingly, any of the approaches described above with reference to FIGS. 5A-6E may be implemented in accordance with method 700, e.g., as would be appreciated by one skilled in the art after reading the present description.

The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, one or more of the various processes included in method 700 may be performed by the controller 418 of FIG. 4. However, in various other embodiments, the method 700 may be partially or entirely performed by a controller, a processor, a computer, etc., or some other device having one or more processors therein. Thus, in some embodiments, method 700 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

Figure 7:
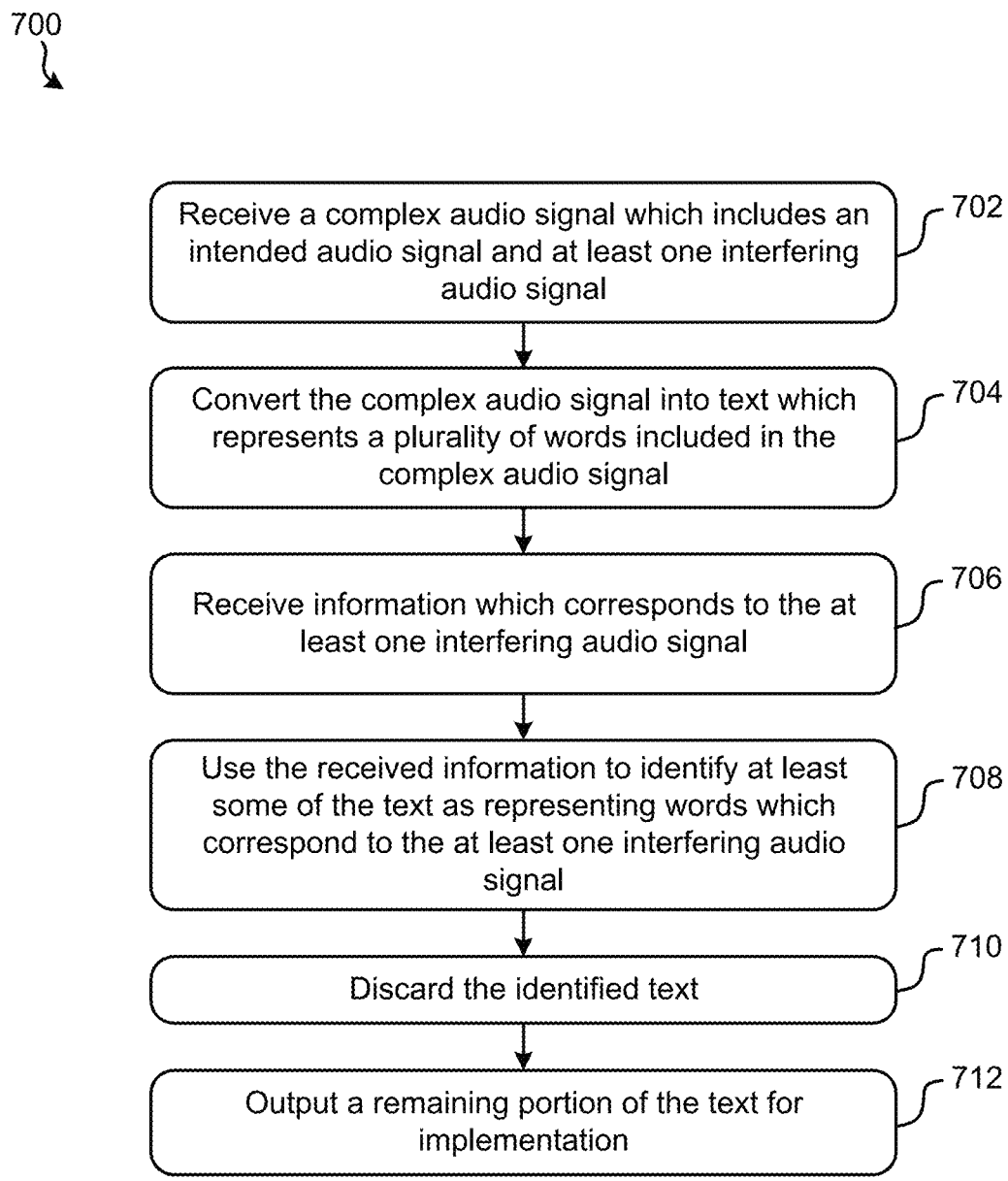
FIG. 7 is a flowchart of a method in accordance with one embodiment.

As shown in FIG. 7, operation 702 of method 700 includes receiving a complex audio signal. As mentioned above, the complex audio signal may include an intended audio signal and at least one interfering audio signal. Moreover, the complex audio signal may be received from a user integrated device, and in some approaches. The intended audio signal may thereby be a voice-based command originating from a user in some approaches.

Operation 704 includes converting the complex audio signal into text which represents a plurality of words included in the complex audio signal. In other words, operation 704 includes converting the complex audio signal from the audio domain into the word domain such that the complex audio signal is represented as text, or equivalent forms of information, e.g., such as logical "1 s" and "0 s". This conversion may be performed using any of the approaches described herein and/or spoken language parsing techniques known in the art.

Referring still to FIG. 7, operation 706 includes receiving information which corresponds to the at least one interfering audio signal. Again, although the type of information received may vary depending on the approach, the information itself may be used to better identify the at least one interfering audio signal. In other words, the information received may be used to increase the accuracy and efficiency by which interfering audio signals included in the complex audio signal may be detected. Moreover, this identification of the interfering audio signals may be performed in the word domain.

Looking to operation 708, the received information is used to identify at least some of the text as representing words which correspond to the at least one interfering audio signal, while operation 710 includes discarding the identified text. Furthermore, operation 712 includes outputting a remaining portion of the text, e.g., for actual implementation of the intended audio signal. The process of outputting the remaining portion of the text and/or the actual implementation of the intended audio signal (e.g., voice-based command) may include any of the approaches described above.

It follows that various ones of the embodiments included herein are able to remove background noise from received complex audio signals at a level of accuracy and efficiency which has not been conventionally achievable. As a result, the accuracy by which user-based commands may ultimately be satisfied is significantly increased. Moreover, these improvements are achieved without introducing any processing delay into the process of interpreting received audio signals.

These achievements may also be implemented in a number of different contextual settings (e.g., system architectures), thereby increasing the breadth over which the improvements are experienced. For instance, some of the embodiments included herein may be implemented in a cloud-based system which is able to provide improved performance to a plurality of users in a plurality of different locations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    receiving a complex audio signal, wherein the complex audio signal includes an intended audio signal and at least one interfering audio signal, wherein the intended audio signal is a voice-based command originating from a user;
    receiving information which corresponds to the at least one interfering audio signal, wherein the received information includes network activity experienced by a network router which corresponds to the user;
    using the received information to identify portions of the complex audio signal as being the at least one interfering audio signal;
    removing the identified portion of the complex audio signal from the complex audio signal; and
    outputting a remaining portion of the complex audio signal,
    wherein using the received information to identify portions of the complex audio signal as being the at least one interfering audio signal includes:
        identifying audio signals included in the network activity;
        comparing the audio signals with the complex audio signal; and
        identifying matches between the audio signals and the complex audio signal as portions of the at least one interfering audio signal.

2. The computer-implemented method of claim 1, wherein the received information includes:
    a timestamp which identifies a time that the voice-based command was originated;
    content which corresponds to the at least one interfering audio signal; and
    an offset which identifies a portion of the content which produced the at least one interfering audio signal at the time that the voice-based command was originated.

3. The computer-implemented method of claim 2, wherein the content includes an actual copy of the at least one interfering audio signal, or a live stream of the at least one interfering audio signal.

4. The computer-implemented method of claim 1, wherein the received information includes:
    a timestamp which identifies a time that the voice-based command was originated.

5. The computer-implemented method of claim 1, wherein the received information includes:
    a timestamp which identifies a time that the voice-based command was originated; and
    audio samples collected from one or more other users at about the time that the voice-based command was originated, the one or more other users being located in a same area as the user which originated the voice-based command,
    wherein using the received information to identify portions of the complex audio signal as being the at least one interfering audio signal includes:
        comparing the audio samples with the complex audio signal; and
        identifying matches between the audio samples and the complex audio signal as portions of the at least one interfering audio signal.

6. The computer-implemented method of claim 1, wherein using the received information to identify portions of the complex audio signal as being the at least one interfering audio signal includes:
    converting the complex audio signal into a plurality of fingerprints;
    comparing the plurality of fingerprints to a database of fingerprints which represent known audio signals; and
    using matches between the plurality of fingerprints and the database of fingerprints to determine whether the respective portions of the complex audio signal correspond to the interfering audio signal.

7. The computer-implemented method of claim 6, comprising:
    using the received information which corresponds to the at least one interfering audio signal to reduce a size of the database compared to the plurality of fingerprints,
    wherein the received information includes contextual information which corresponds to the user and/or user integrated devices in a same environment as the user.

8. The computer-implemented method of claim 1, wherein the received information includes a second complex audio signal, wherein the second complex audio signal includes the intended audio signal and at least a second interfering audio signal, wherein using the received information to identify portions of the complex audio signal as being the at least one interfering audio signal includes:
    comparing the complex audio signal with the second complex audio signal;
    identifying matches between the complex audio signal and the second complex audio signal as portions of the intended audio signal; and identifying the remaining portions of the complex audio signal and the second complex audio signal which do not match as portions of the at least one interfering audio signal.

9. A computer-implemented method, comprising:

receiving a complex audio signal, wherein the complex audio signal includes an intended audio signal and at least one interfering audio signal, wherein the intended audio signal is a voice-based command originating from a user;

converting the complex audio signal into text which represents a plurality of words included in the complex audio signal;

receiving information which corresponds to the at least one interfering audio signal, wherein the received information includes audio samples collected from one or more other users at about a time that the voice-based command was originated, the one or more other users being located in a same area as the user which originated the voice-based command, wherein the audio samples collected from the one or more other users includes the at least one interfering audio signal;

using the received information to identify at least some of the text as representing words which correspond to the at least one interfering audio signal;

discarding the identified text; and outputting a remaining portion of the text, wherein the received information includes a second complex audio signal, wherein the second complex audio signal includes the intended audio signal and at least a second interfering audio signal, wherein using the received information to identify portions of the complex audio signal as being the at least one interfering audio signal includes:

converting the second complex audio signal into supplemental text which represents a plurality of words included in the second complex audio signal, comparing the text with the supplemental text, identifying matches between the text and the supplemental text as representing words which correspond to the intended audio signal, and identifying the remaining portions of the text and the supplemental text which do not match as representing words which correspond to the at least one interfering audio signal.

10. The computer-implemented method of claim 9, wherein the received information includes:

a timestamp which identifies the time that the voice-based command was originated;

content which corresponds to the at least one interfering audio signal; and an offset which identifies a portion of the content which produced the at least one interfering audio signal at the time that the voice-based command was originated.

11. The computer-implemented method of claim 10, wherein the content includes an actual copy of the at least one interfering audio signal, or a live stream of the at least one interfering audio signal.

12. The computer-implemented method of claim 9, wherein the received information includes:

a timestamp which identifies the time that the voice-based command was originated; and network activity experienced by a network router which corresponds to the user, wherein using the received information to identify at least some of the text as representing words which correspond to the at least one interfering audio signal includes:

identifying audio signals included in the network activity;

converting the identified audio signals into supplemental text which represents a plurality of words included in the identified audio signals;

comparing the text with the supplemental text; and identifying matches between the text and the supplemental text as representing words which correspond to the at least one interfering audio signal.

13. The computer-implemented method of claim 9, wherein the received information includes:

a timestamp which identifies the time that the voice-based command was originated.

14. A computer program product comprising a computer readable storage medium having program instructions embodied therewith, wherein the computer readable storage medium is not a transitory signal per se, the program instructions readable and/or executable by a controller to cause the controller to perform a method comprising:

receiving, by the controller, a complex audio signal, wherein the complex audio signal includes an intended audio signal and at least one interfering audio signal, wherein the intended audio signal is a voice-based command originating from a user;

converting, by the controller, the complex audio signal into text which represents a plurality of words included in the complex audio signal;

receiving, by the controller, information which corresponds to the at least one interfering audio signal;

using, by the controller, the received information to identify at least some of the text as representing words which correspond to the at least one interfering audio signal;

discarding, by the controller, the identified text; and outputting, by the controller, a remaining portion of the text, wherein the received information includes a second complex audio signal, wherein the second complex audio signal includes the intended audio signal and at least a second interfering audio signal, wherein using the received information to identify portions of the complex audio signal as being the at least one interfering audio signal includes:

converting the second complex audio signal into supplemental text which represents a plurality of words included in the second complex audio signal;

comparing the text with the supplemental text;

identifying matches between the text and the supplemental text as representing words which correspond to the intended audio signal; and identifying the remaining portions of the text and the supplemental text which do not match as representing words which correspond to the at least one interfering audio signal.

15. The computer program product of claim 14, wherein the received information includes:

a timestamp which identifies a time that the voice-based command was originated;

content which corresponds to the at least one interfering audio signal; and an offset which identifies a portion of the content which produced the at least one interfering audio signal at the time that the voice-based command was originated.

16. The computer program product of claim 15, wherein the content includes an actual copy of the at least one interfering audio signal, or a live stream of the at least one interfering audio signal.

17. The computer program product of claim 14, wherein the received information includes:
   a timestamp which identifies a time that the voice-based command was originated; and
   network activity experienced by a network router which corresponds to the user,
   wherein using the received information to identify at least some of the text as representing words which correspond to the at least one interfering audio signal includes:
      identifying audio signals included in the network activity;
      converting the identified audio signals into supplemental text which represents a plurality of words included in the identified audio signals;
      comparing the text with the supplemental text; and
      identifying matches between the text and the supplemental text as representing words which correspond to the at least one interfering audio signal.

18. The computer program product of claim 14, wherein the received information includes:
   a timestamp which identifies a time that the voice-based command was originated; and
   audio samples collected from one or more other users at about the time that the voice-based command was originated, the one or more other users being located in a same area as the user which originated the voice-based command,
   wherein using the received information to identify portions of the complex audio signal as being the at least one interfering audio signal includes:
      converting the collected audio samples into supplemental text which represents a plurality of words included in the collected audio samples;
      comparing the text with the supplemental text; and
      identifying matches between the text and the supplemental text as representing words which correspond to the at least one interfering audio signal.

\* \* \* \* \*